(12) United States Patent
Kim et al.

(10) Patent No.: US 11,570,831 B2
(45) Date of Patent: Jan. 31, 2023

(54) ELECTRONIC DEVICE FOR CONTROLLING CELLULAR NETWORK FUNCTION IN WIRELESS NETWORK ENVIRONMENT AND METHOD THEREOF

(71) Applicant: SAMSUNG ELECTRONICS CO., LTD., Suwon-si (KR)

(72) Inventors: Dongwoo Kim, Suwon-si (KR);
Hyunchul Lee, Suwon-si (KR);
Sungjun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/934,396

(22) Filed: Jul. 21, 2020

(65) Prior Publication Data

US 2021/0100049 A1 Apr. 1, 2021

(30) Foreign Application Priority Data

Sep. 30, 2019 (KR) .......................... 10-2019-0120483

(51) Int. Cl.
*H04W 76/15* (2018.01)
*H04W 8/08* (2009.01)
(Continued)

(52) U.S. Cl.
CPC ............. *H04W 76/15* (2018.02); *H04W 8/08* (2013.01); *H04W 84/042* (2013.01); *H04W 88/06* (2013.01)

(58) Field of Classification Search
CPC ..... H04W 76/15; H04W 8/08; H04W 84/042; H04W 88/06
(Continued)

(56) References Cited

U.S. PATENT DOCUMENTS 8,582,564 B2 11/2013 Bae
2018/0220344 A1 8/2018 Shaheen
(Continued)

FOREIGN PATENT DOCUMENTS

| JP | WO2019031528 A1 | 7/2020 |
| KR | 10-1460151 | 11/2014 |
| WO | 2017-171953 | 10/2017 |

OTHER PUBLICATIONS

International Search Report and Written Opinion dated Oct. 30, 2020 in corresponding International Application No. PCT/KR2020/009511.

*Primary Examiner* — Gbemileke J Onamuti
(74) *Attorney, Agent, or Firm* — Nixon & Vanderhye P.C.

(57) ABSTRACT

An electronic device is provided. The electronic device includes: wireless communication circuitry, at least one processor operatively connected with the wireless communication circuitry, and a memory operatively connected with the at least one processor. The memory stores instructions which, when executed, cause the at least one processor to control the electronic device to: identify a state of the electronic device, receive a system information block (SIB) from a first base station supporting a first cellular network via the wireless communication circuitry, identify whether a network to which the electronic device belongs supports dual connectivity (DC) between the first cellular network and a second cellular network based on information included in the SIB, enable a second cellular network function of the wireless communication circuitry based on the network supporting the DC, and transmit information indicating that the second cellular network function of the electronic device is enabled to the network via the wireless communication circuitry.

16 Claims, 17 Drawing Sheets

(51) Int. Cl.
*H04W 84/04* (2009.01)
*H04W 88/06* (2009.01)

(58) Field of Classification Search
USPC .......................................................... 370/252
See application file for complete search history.

(56) References Cited

U.S. PATENT DOCUMENTS

| | | |
|---|---|---|
| 2018/0368016 A1 | 12/2018 | Lee et al. |
| 2019/0059026 A1 | 2/2019 | Huang-Fu et al. |
| 2019/0059045 A1 | 2/2019 | Huang-Fu et al. |
| 2019/0289650 A1 | 9/2019 | Yoo et al. |
| 2020/0100181 A1* | 3/2020 | Jia .......................... H04W 76/27 |
| 2020/0187209 A1* | 6/2020 | Tamura ................. H04W 76/15 |
| 2020/0228382 A1* | 7/2020 | Lin ........................ H04W 36/08 |
| 2020/0288338 A1 | 9/2020 | Freda et al. |
| 2021/0045177 A1* | 2/2021 | Lee ........................ H04W 76/18 |
| 2021/0075496 A1 | 3/2021 | Mildh et al. |

* cited by examiner

ELECTRONIC DEVICE FOR CONTROLLING CELLULAR NETWORK FUNCTION IN WIRELESS NETWORK ENVIRONMENT AND METHOD THEREOF

CROSS-REFERENCE TO RELATED APPLICATION

This application is based on and claims priority under 35 U.S.C. § 119 to Korean Patent Application No. 10-2019-0120483, filed on Sep. 30, 2019, in the Korean Intellectual Property Office, the disclosure of which is incorporated by reference herein its entirety.

BACKGROUND

1. Field

The disclosure relates to technologies for controlling a cellular network function in a wireless network environment.

2. Description of Related Art

The $3^{rd}$ generation partnership project (3GPP) describes a technology about a network connected with a user terminal (or referred to as "electronic device") to perform wireless communication. The network has advanced from 1 generation (G) network to 2G network, 3G network, and 4G network. Recently a technology about 5G network has been developed. The 4G network may be referred to as a long term evolution (LTE) network, and the 5G network may be referred to as a new ratio (NR) network. The NR network may include a network architecture model different from the LTE network. For example, because components included in a 5G core network are not classified according to a physical entity and are classified according to a function, the NR network may provide the user terminal with a plurality of network services. The network service may be classified as, for example, enhanced mobile broadband (eMBB), ultra-reliable and low latency communication (URLLC), or massive machine type communication (mMTC).

A network architecture may include a radio access network (RAN) and a core network. The RAN may perform wireless communication with the user terminal, and the core network may manage at least one of registration, authentication, mobility, or a policy of the user terminal.

The 3GPP defines a deployment option indicating a combination of the RAN (e.g., LTE RAN or NR RAN) capable of performing wireless communication with the user terminal and the core network (e.g., an LTE core network or an NR core network). Because the NR core network is connected with the user terminal over the LTE RAN as well as the NR RAN, although the user is connected to the LTE RAN, the user terminal may receive a network service from the NR core network. Furthermore, the user terminal may receive wireless data from the NR RAN at the same time as being connected to the LTE RAN by an evolved-universal terrestrial radio access-new radio (EN)-dual connectivity (DC) technology which makes it possible for the user terminal to perform wireless communication with a plurality of networks.

A specific network may fail to support an NR network (or EN-DC) depending on a deployment option, and a user terminal supporting the NR network may move to the network which does not support the NR network. When the user terminal transmits information according to the NR specification, because a network which does not support the NR network receives unnecessary information, an overload of the network may occur. When the user terminal updates software depending on the deployment option of the network to prevent an overload of the network from being increased, a user of the user terminal should continue updating the software.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and provide at least the advantages described below. Accordingly, embodiments the disclosure provide an electronic device for dynamically controlling EN-DC and a method thereof.

In accordance with an example embodiment of the disclosure, an electronic device is provided. The electronic device may include: wireless communication circuitry, at least one processor operatively connected with the wireless communication circuitry, and a memory operatively connected with the at least one processor. The memory may store instructions which, when executed, cause the at least one processor to control the electronic device to: identify a state of the electronic device, receive a system information block (SIB) from a first base station supporting a first cellular network via the wireless communication circuitry, identify whether a network to which the electronic device belongs supports dual connectivity (DC) between the first cellular network and a second cellular network based on information included in the SIB, enable a second cellular network function of the wireless communication circuitry based on the network supporting the DC, and transmit information indicating that the second cellular network function of the electronic device is enabled to the network via the wireless communication circuitry.

In accordance with example embodiment of the disclosure, a method of an electronic device is provided. The method may include: identifying a state of the electronic device, receiving a system information block (SIB) from a first base station supporting a first cellular network, identifying whether a network to which the electronic device belongs supports dual connectivity (DC) between the first cellular network and a second cellular network based on information included in the SIB, enabling a second cellular network function of the electronic device based on the network supporting the DC, and transmitting information indicating that the second cellular network function of the electronic device is enabled to the network.

In accordance with another example embodiment of the disclosure, an electronic device is provided. The electronic device may include: wireless communication circuitry and at least one processor operatively connected with the wireless communication circuitry. The at least one processor may be configured to: detect the electronic device camping on a first cell supporting a first cellular network, receive a system information block (SIB) from a base station of the first cell, identify whether a network to which the electronic device belongs supports a second cellular network based on the received SIB, enable a second cellular network function of the wireless communication circuitry based on the network supporting the second cellular network, and control the electronic device to transmit information indicating that the second cellular network function of the electronic device is enabled to the network via the wireless communication circuitry.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

With regard to description of drawings, the same or similar denotations may be used for the same or similar components.

DETAILED DESCRIPTION

Hereinafter, various example embodiments of the disclosure may be described with reference to accompanying drawings. However, it should be understood that the various example embodiments are not intended to limit the disclosure to specific implementation forms and includes various modifications, equivalents, and/or alternatives of embodiments of the disclosure.

Figure 1:
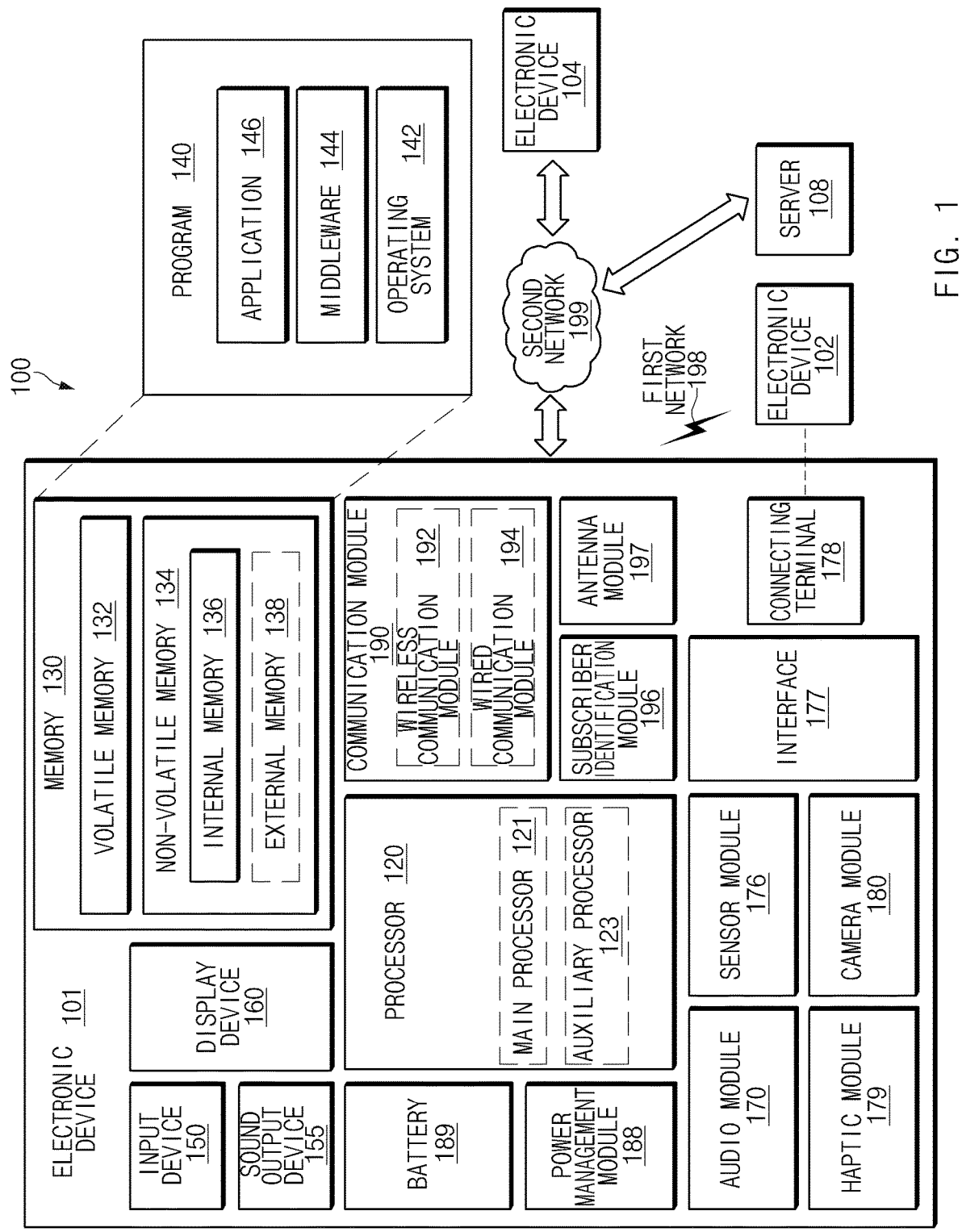
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
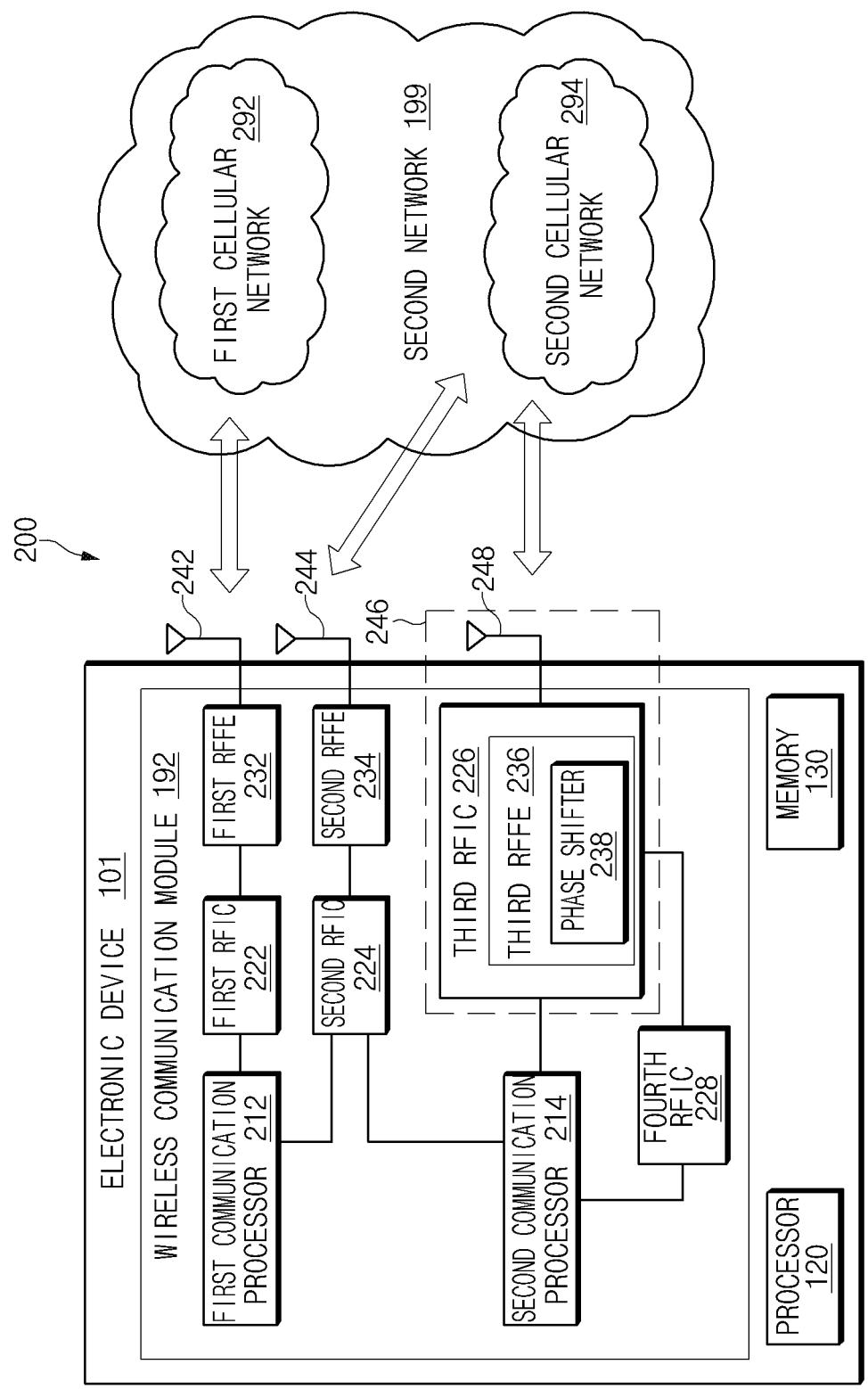
FIG. 2 is a block diagram illustrating an example electronic device for supporting legacy network communication and 5G network communication according to various embodiments.

FIG. 2 is a block diagram 200 illustrating an example electronic device 101 for supporting legacy network communication and 5G network communication according to various embodiments.

Referring to FIG. 2, the electronic device 101 may include a first communication processor (e.g., including communication processing circuitry) 212, a second communication processor (e.g., including communication processing circuitry) 214, a first radio frequency integrated circuit (RFIC) 222, a second RFIC 224, a third RFIC 226, a fourth RFIC 228, a first radio frequency front end (RFFE) (e.g., including circuitry) 232, a second RFFE (e.g., including circuitry) 234, a first antenna module (e.g., including at least one antenna) 242, a second antenna module (e.g., including at least one antenna) 244, and an antenna 248. The electronic device 101 may further include a processor (e.g., including processing circuitry) 120 and a memory 130. A second network 199 may include a first cellular network 292 and a second cellular network 294. According to other embodiments, the electronic device 101 may further include at least one of the components shown in FIG. 1. The second network 199 may further include at least one other network. According to an embodiment, the first communication processor 212, the second communication processor 214, the first RFIC 222, the second RFIC 224, the fourth RFIC 228, the first RFFE 232, and the second RFFE 234 may configure at least a part of a wireless communication module 192 of FIG. 1. According to another embodiment, the fourth RFIC 228 may be omitted or may be included as a part of the third RFIC 226.

The first communication processor 212 may include various communication processing circuitry and establish a communication channel of a band to be used for wireless communication with the first cellular network 292 and may support legacy network communication over the established communication channel. According to various embodiments, the first cellular network 292 may, for example, be a legacy network including $2^{nd}$ generation (2G), $3^{rd}$ generation (3G), $4^{th}$ generation (4G), and/or long term evolution (LTE) network(s). The second communication processor 214 may include various communication processing circuitry and establish a communication channel corresponding to a specified band (e.g., about 6 GHz to about 60 GHz) among bands to be used for wireless communication with the second cellular network 294 and may support $5^{th}$ generation (5G) network communication over the established communication channel. According to various embodiments, the second cellular network 294 may, for example, be a 5G network as set forth, for example in $3^{rd}$ generation partnership project (3GPP). In addition, according to an embodiment, the first communication processor 212 or the second communication processor 214 may establish a communication channel corresponding to another specified band (e.g., about 6 GHz or less) among bands used for wireless communication with the second cellular network 294 and may support 5G network communication over the established communication channel. According to an embodiment, the first communication processor 212 and the second communication processor 214 may be implemented in a single chip or a single package. According to various embodiments, the first communication processor 212 and/or the second communication processor 214 may be configured together with the processor 120, an auxiliary processor 123 of FIG. 1, or a communication module 190 of FIG. 1 in a single chip or a single package.

Upon transmission, the first RFIC 222 may convert a baseband signal generated by the first communication processor 212 into an RF signal of, for example, about 700 MHz to about 3 GHz used for the first cellular network 292 (e.g., the legacy network). Upon reception, an RF signal may be obtained from the first cellular network 292 (e.g., the legacy network) via an antenna (e.g., the first antenna module 242) and may be preprocessed via an RFFE (e.g., the first RFFE 232). The first RFIC 222 may convert the preprocessed RF signal into a baseband signal to be able to be processed by the first communication processor 212.

Upon transmission, the second RFIC 224 may convert a baseband signal generated by the first communication processor 212 or the second communication processor 214 into an RF signal of a Sub6 band (e.g., about 6 GHz or less) (hereinafter referred to as "5G Sub6 RF signal") used for the second cellular network 294 (e.g., the 5G network). Upon reception, a 5G Sub6 RF signal may be obtained from the second cellular network 294 (e.g., the 5G network) via an antenna (e.g., the second antenna module 244) and may be preprocessed via an RFFE (e.g., the second RFFE 234). The second RFIC 224 may convert the preprocessed 5G Sub6 RF signal into a baseband signal to be able to be processed by a corresponding communication processor between the communication processor 212 or the second communication processor 214.

The third RFIC 226 may convert a baseband signal generated by the second communication processor 214 into an RF signal of a 5G Above6 band (e.g., about 6 GHz to about 60 GHz) (hereinafter referred to as "5G Above6 RF signal") to be used in the second cellular network 294 (e.g., the 5G network). Upon reception, a 5G Above6 RF signal may be obtained from the second cellular network 294 (e.g., the 5G network) via an antenna (e.g., the antenna 248) and may be preprocessed via the third RFFE 236. For example, the third RFFE 236 may preprocess a signal using a phase shifter (e.g., including phase shifting circuitry) 238. The third RFIC 226 may convert the preprocessed 5G Above6 RF signal into a baseband signal to be able to be processed by the second communication processor 214. According to an embodiment, the third RFFE 236 may be a part of the third RFIC 226.

According to an embodiment, the electronic device 101 may include the fourth RFIC 228 independently of the third RFIC 226 or as at least a part of the third RFIC 226. In this case, the fourth RFIC 228 may convert a baseband signal generated by the second communication processor 214 into an RF signal of an intermediate frequency band (e.g., about 9 GHz to about 11 GHz) (hereinafter referred to as "IF signal") and may delivery the IF signal to the third RFIC 226. The third RFIC 226 may convert the IF signal into a 5G Above6 RF signal. Upon reception, a 5G Above6 RF signal may be received from the second cellular network 294 (e.g., the 5G network) via an antenna (e.g., the antenna 248) and may be converted into an IF signal by the third RFIC 226. The fourth RFIC 228 may convert the IF signal into a baseband signal to be able to be processed by the second communication processor 214.

According to an embodiment, the first RFIC 222 and the second RFIC 224 may, for example, be implemented as at least a part of a single chip or a single package. According to an embodiment, the RFFE 232 and the second RFFE 234 may be implemented as at least a part of a single chip or a single package. According to an embodiment, at least one of the first antenna module 242 or the second antenna module 244 may be omitted or may be combined with another antenna module to process RF signals of a plurality of corresponding bands.

According to an embodiment, the third RFIC 226 and the antenna 248 may be arranged on the same substrate to configure the third antenna module 246. For example, the wireless communication module 192 or the processor 120 may be arranged on a first substrate (e.g., a main printed circuit board (PCB)). In this case, as the third RFIC 226 is disposed on a partial region (e.g., a lower surface) of a second substrate (e.g., a sub-PCB) independent of the first substrate and as the antenna 248 is disposed on another partial region (e.g., an upper surface), the third antenna module 246 may be configured. According to an embodiment, the antenna 248 may include, for example, an antenna array which may be used for beamforming. As the third RFIC 226 and the antenna 248 are arranged on the same substrate, it is possible to reduce a length of a transmission line between the third RFIC 226 and the antenna 248. For example, this may reduce that, for example, a signal of a high frequency band (e.g., about 6 GHz to about 60 GHz) used for 5G network communication is lost (e.g., attenuated) by the transmission line. Due to this, the electronic device 101 may enhance quality or speed of communication with the second cellular network 294 (e.g., the 5G network).

The second cellular network 294 (e.g., the 5G network) may be operated independently of the first cellular network 292 (e.g., the legacy network) (e.g., standalone (SA)) or may be connected and operated with the first cellular network 292 (e.g., the legacy network) (e.g., non-standalone (NSA)). For example, there may be only an access network (e.g., a 5G radio access network (RAN) or a next generation RAN (NG RAN)) in the 5G network and there may be no core network (e.g., next generation core (NGC)) in the 5G network. In this case, the electronic device 101 may access the access network of the 5G network and may then access an external network (e.g., the Internet) under control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130 and may be accessed by another component (e.g., the processor 120, the first communication processor 212, or the second communication processor 214).

Figure 3:
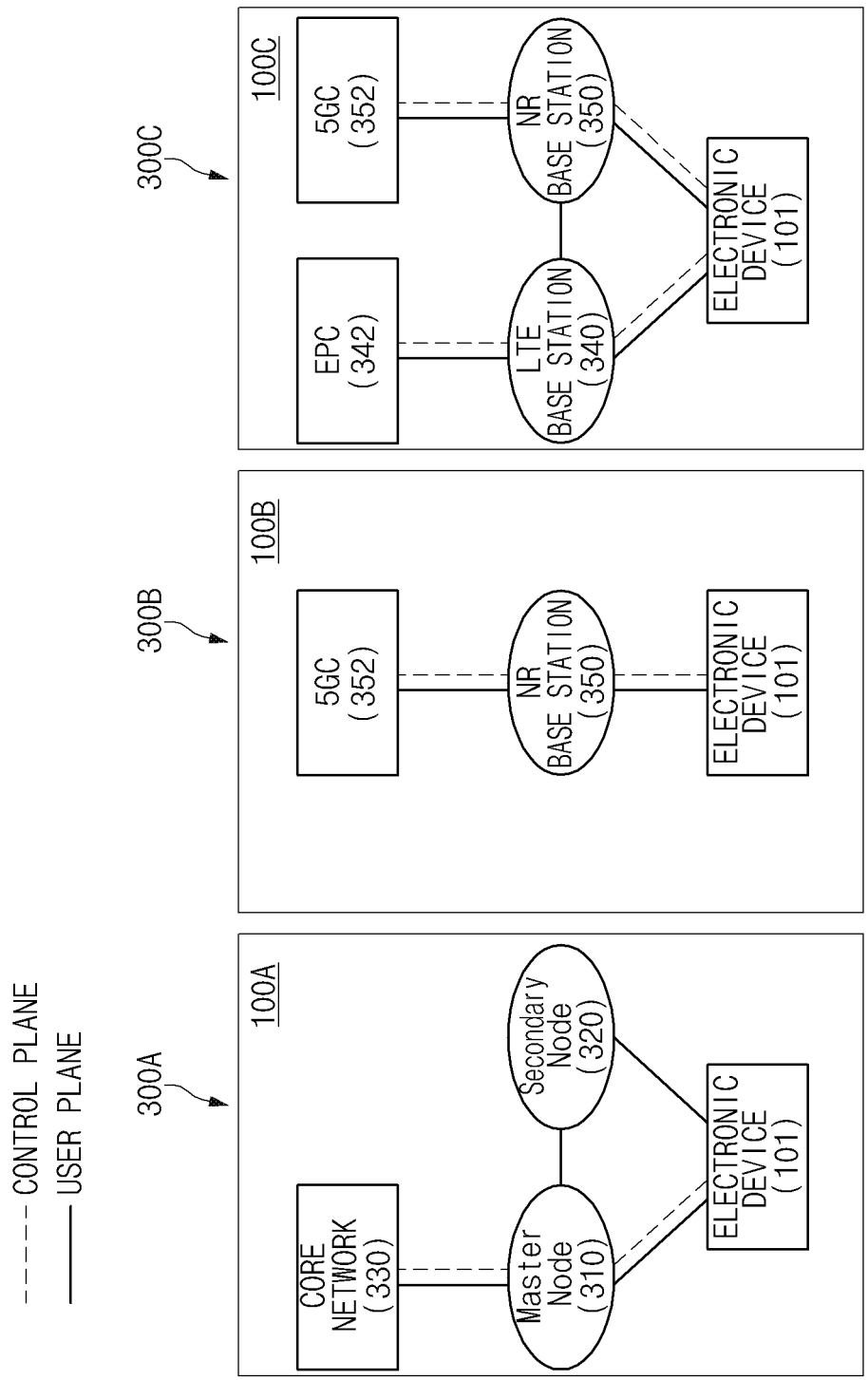
FIG. 3 is a diagram illustrating example wireless communication systems for providing a network of legacy communication and/or 5G communication according to various embodiments.

FIG. 3 is a diagram illustrating example wireless communication systems for providing a network of legacy communication and/or 5G communication according to various embodiments.

Referring to FIG. 3, network environments 100A, 100B, and 100C may include at least one of a legacy network (e.g., a first cellular network 292 of FIG. 2) and a 5G network (e.g., a second cellular network 294 of FIG. 2). The legacy network may include, for example, a 4G or LTE base station 340 (e.g., an eNodeB (eNB)) of the 3GPP standard for supporting radio access to an electronic device 101 and an evolved packet core (EPC) 342 for managing 4G communication. The 5G network may include, for example, a new radio (NR) base station 350 (e.g., a gNodeB (gNB)) for supporting radio access to the electronic device 101 and a 5th generation core (5GC) (or a next generation core (NGC)) 352 for managing 5G communication of the electronic device 101. According to various embodiments, the electronic device 101 may transmit and receive a control message and user data through the legacy communication and/or 5G communication. The control message may include a message associated with at least one of security control, bearer setup, authentication, registration, or mobility management of the electronic device 101. The user data may refer to, for example, user data except for a control message transmitted and received between the electronic device 101 and a core network 330 (e.g., the EPC 342).

An architecture indicating a combination of a base station (e.g., the LTE base station 340 or the NR base station 350) connected with the electronic device 101 and a core network (e.g., the EPC 342 or the 5GC 352) may, for example, be referred to as a deployment option or an option.

Referring to reference numeral 300A, the electronic device 101 according to an embodiment may transmit and receive at least one of a control message or user data with at least a portion (e.g., the NR base station 350 or the 5GC 352) of the 5G network using at least a portion (e.g., the LTE base station 340 or the EPC 342) of the legacy network.

According to various embodiments, a network environment 100A may include a network environment for providing dual connectivity (DC) to the LTE base station 340 and the NR base station 350 and transmitting and receiving a control message with the electronic device 101 over the one core network 330 between the EPC 342 or the 5GC 352. The DC may include, for example, multi-radio access technology (RAT) dual connectivity (MR-DC) or E-UTRA NR dual connectivity (EN-DC).

According to various embodiments, in a DC environment, one of the LTE base station 340 or the NR base station 350 may operate as a master node (MN) 310 and the other may operate as a secondary node (SN) 320. The MN 310 may be connected to the core network 330 to transmit and receive a control message. The MN 310 and the SN 320 may be connected through a network interface and may transmit and receive a message associated with managing a radio resource (e.g., a communication channel).

According to various embodiments, the MN 310 may include the LTE base station 340, the SN 320 may include the NR base station 350, and the core network 300 may include the EPC 342. For example, the electronic device 101 may transmit and receive a control message via the LTE base station 340 and the EPC 342 and may transmit and receive user data via the LTE base station 340 and the NR base station 350.

For example, the LTE base station 340 and the NR base station 350 may be connected to the EPC 342 in a non-standalone (NSA) mode. When the LTE base station 340 operates as the MN 310, a control plane and a user plane of the LTE base station 340 may be connected to the EPC 342, and a user plane of the NR base station 350 may be connected to the EPC 342 via the LTE base station 340 or may be directly connected to the EPC 342. For another example, the NR base station 350 and the LTE base station 340 may be connected to the 5GC 352 in the NSA mode. When the LTE base station 340 operates as the MN 310, the control plane and the user plane of the LTE base station 340 may be connected to the 5GC 352, and the user plane of the NR base station 350 may be connected to the 5GC 352 via the LTE base station 340 or may be directly connected to the 5GC 352.

Referring to reference numeral 300B, according to various embodiments, the 5G network may transmit and receive a control message and user data independently of the electronic device 101.

Referring to reference numeral 300C, the legacy network and the 5G network according to various embodiments may transmit and receive data independently of each other. For example, the electronic device 101 and the EPC 342 may transmit and receive a control message and user data via the LTE base station 340. For another example, the electronic device 101 and the 5GC 352 may transmit and receive a control message and user data via the NR base station 350.

According to various embodiments, the electronic device 101 may be registered with at least one of the EPC 342 or the 5GC 352 to transmit and receive a control message.

According to various embodiments, the EPC 342 or the 5GC 352 may interwork to manage communication of the electronic device 101. For example, movement information of the electronic device 101 may be transmitted and received via an interface between the EPC 342 and the 5GC 352.

In embodiments described below, the electronic device 101 may control an NR function in an NSA system or may control an NR function in an SA system. The NSA system may include a deployment option where the electronic device 101 accesses the MN 310 (e.g., the LTE base station 340) and the SN 320 (e.g., the NR base station 350) using EN-DC like the network environment 100A of FIG. 3. The SA system may include a deployment option where the electronic device 101 transmits and receives data independently of the 4G network and the 5G network like the network environment 100C of FIG. 3. In embodiments described below, a first cellular network may refer to a 4G or LTE network, and a second cellular network may refer to a 5G or NR network.

Figure 4:
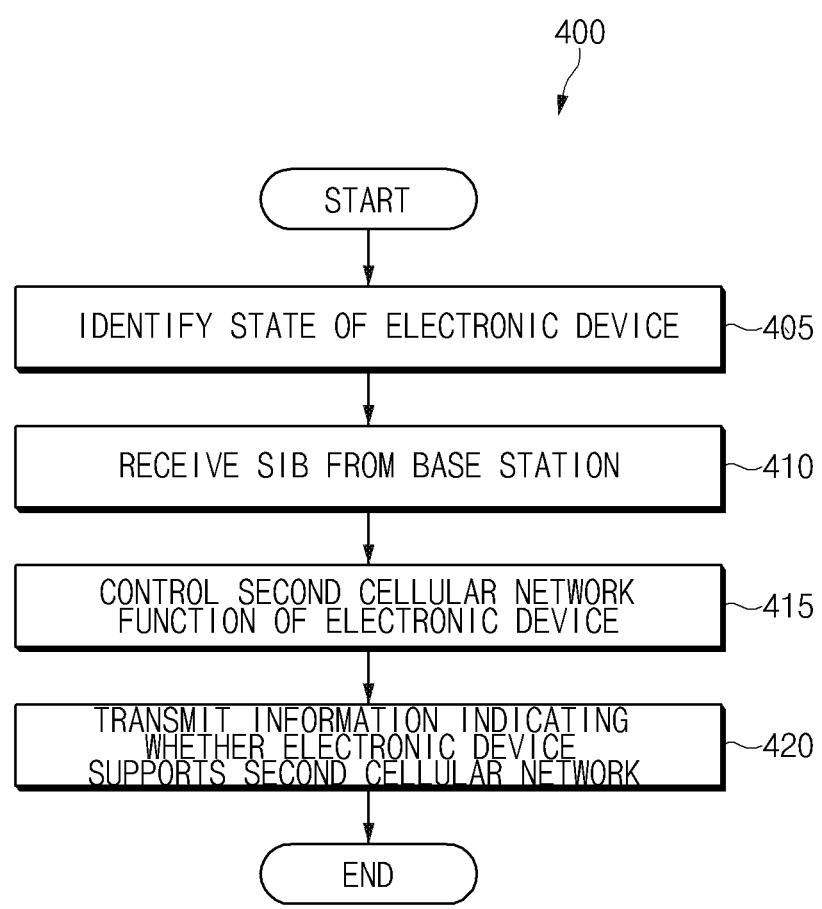
FIG. 4 is a flowchart illustrating an example method of operating an electronic device for controlling an NR function according to various embodiments.

FIG. 4 is a flowchart 400 illustrating an example operation of an electronic device 101 for controlling an NR function according to various embodiments. Operations of the operational flowcharts 400, 600, 900, 1000, 1300, 1400, or 1600, which will be described below, may be performed as the electronic device 101 executes some components of the electronic device 101. For example, the electronic device 101 may perform operations using a processor 120 and/or a wireless communication module 192 of FIG. 2. In this case, the processor 120 or the wireless communication module 192 may perform operations by executing instructions stored in a memory 130 of FIG. 2.

Referring to FIG. 4, in operation 405, the electronic device 101 may identify a state of the electronic device 101. For example, the electronic device 101 may identify that the electronic device 101 is powered on, that the electronic device 101 operates in an idle mode, or that the electronic device 101 camps on an LTE cell. The 'camp-on' may refer, for example, to a state where it is possible for the electronic device 101 to receive system information (e.g., a system information block (SIB)) or paging information from a specific cell (e.g., an LTE cell) by completing cell section (or cell reselection).

In operation 410, the electronic device 101 may receive an SIB from a base station. According to an embodiment, the base station may be a base station which supports a first cellular network 292 (e.g., LTE) of FIG. 2. The SIB may be information broadcast from the base station.

Referring to technical specification (TS) 36.331 of the 3GPP standards, a second type (hereinafter referred to as 'SIB2') of SIB received from an LTE base station 340 of FIG. 3 by the electronic device 101 may include an indicator indicating whether it is possible for an LTE cell which transmits SIB2 in an NSA system to support DC with an NR cell. The indicator may be referred to as 'UpperLayerIndication'. For example, UpperLayerIndication may include 1-bit information. Furthermore, a $24^{th}$ (hereinafter referred to as 'SIB24') type of SIB received from the LTE base station 340 by the electronic device 101 may include information about inter-RAT cell reselection in the SA system. The information may include an NR frequency for cell reselection and information of an NR neighboring cell. The information may be referred to as 'CarrierFreqListNR'.

In operation 415, the electronic device 101 may control a second cellular network function of the electronic device 101. The second cellular network function may include an NR function. According to various embodiments, the electronic device 101 may identify whether a network to which the electronic device 101 belongs supports a 5G network, based on information of an SIB received from a base station and may enable or disable the NR function depending on the identified result. That the electronic device 101 'belongs to' the network may refer, for example, to the electronic device 101 being placed on a location capable of transmitting and receiving data with a corresponding network or is placed on a location adjacent to the location, or that the electronic device 101 accesses the corresponding network. The electronic device 101 may identify whether a current LTE cell supports EN-DC through UpperLayerIndication included in SIB2 or may identify whether a neighboring cell supports the 5G network through CarrierFreqListNR included in SIB24.

In the disclosure, the NR function may, for example, be referred to as a function for transmitting and receiving data with the 3GPP 5G network. For example, when the NR function is enabled in the NSA system, the electronic device 101 may transmit and receive data with the 5G network as well as a 4G network using EN-DC. For another example, when the NR function is enabled in the SA system, the electronic device 101 may transmit and receive data with the 5G network. To enable or disable the NR function (or an EN-DC function), the electronic device 101 may control hardware and/or software for performing wireless communication with the 5G network. The hardware for the 5G network may include, for example, a second communication processor 214, a second RFIC 224, a second RFFE 234, a third RFIC 226, and/or a fourth RFIC 228 of FIG. 2.

In operation 420, the electronic device 101 may transmit information indicating whether the electronic device 101 supports a second cellular network to a network. The information indicating whether the electronic device 101 supports the second cellular network may indicate whether the electronic device 101 enables, for example, the NR function (or the EN-DC function). Information indicating whether the electronic device 101 supports an NR may be included in a message transmitted by the electronic device 101 such that a core network manages the electronic device 101. For example, the electronic device 101 may provide a notification of whether the electronic device 101 supports the NR, through an attach request message or a tracking area update (TAU) message. The electronic device 101 may prevent an overload of the network from being increased, using information indicating whether the electronic device 101 supports the NR.

According to various embodiments, the electronic device 101 may repeatedly perform the operations of the operational flowchart 400 depending on mobility of the electronic device 101. For example, the electronic device 101 may receive an SIB from a cell which is changed or maintained after performing cell reselection and may control the NR function based on the received SIB.

Figure 5:
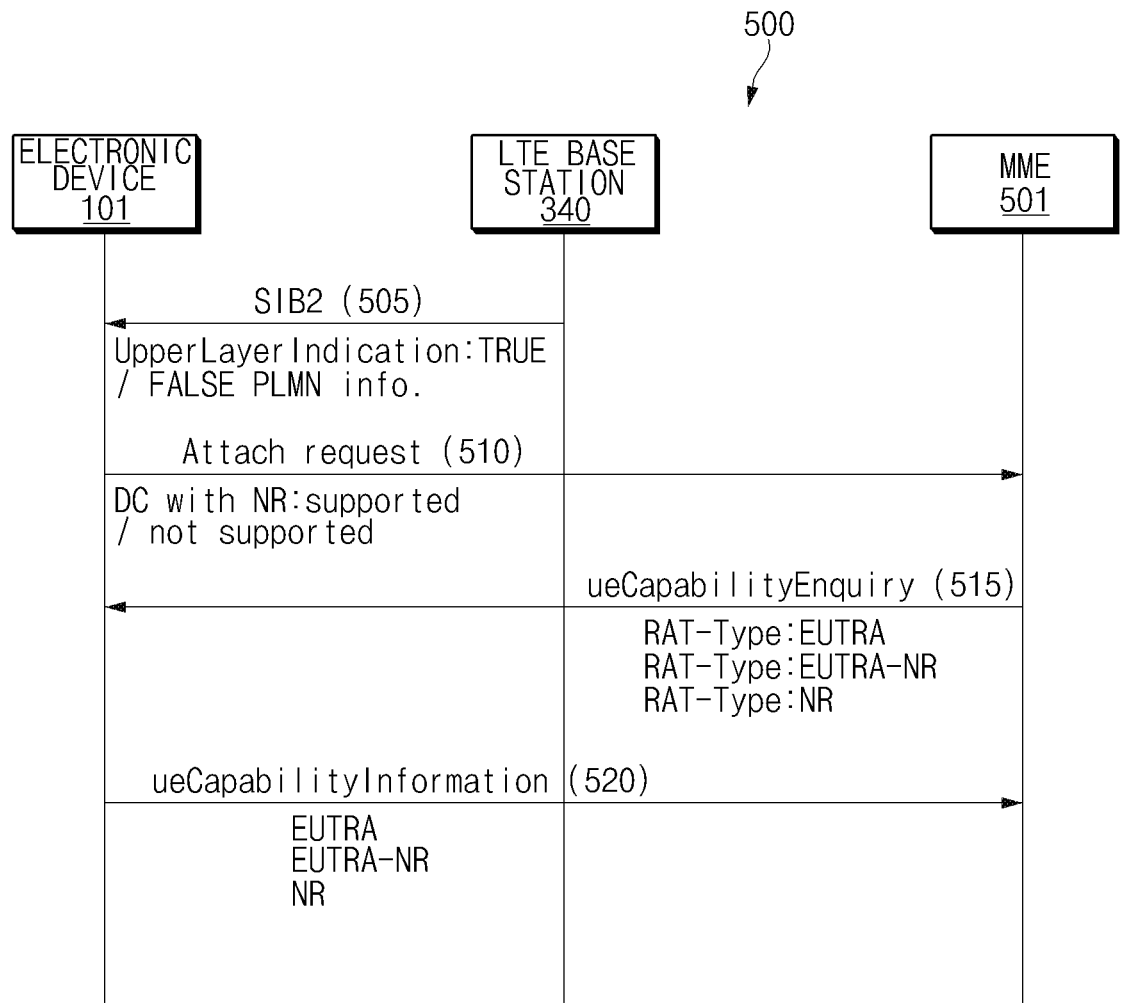
FIG. 5 is a signal flow diagram illustrating an example operation of controlling EN-DC in a non-standalone (NSA) system according to various embodiments.
Figure 6:
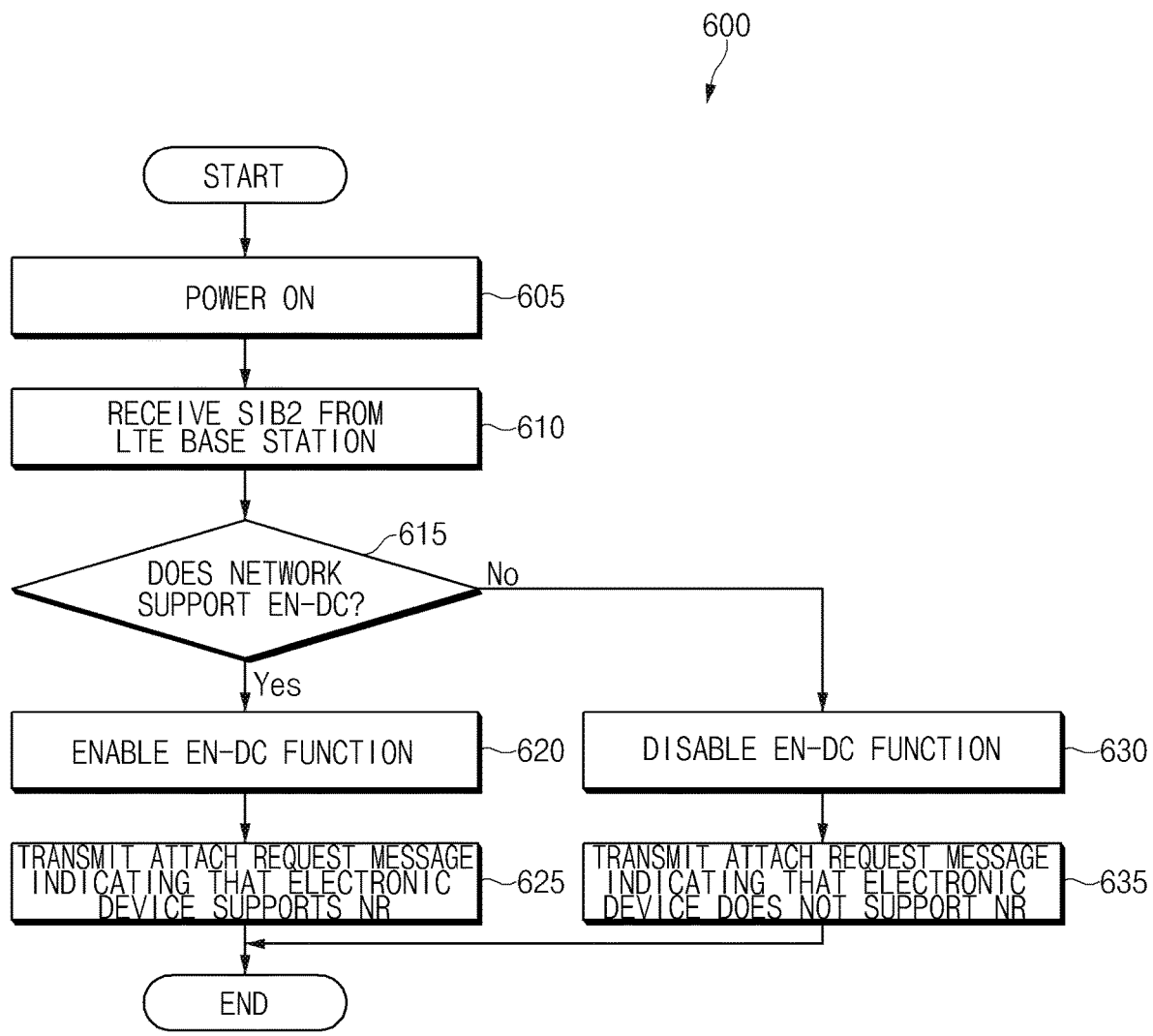
FIG. 6 is flowchart illustrating an example method of operating an electronic device for controlling EN-DC in an NSA system according to various embodiments.

FIGS. 5 and 6 are a signal flow diagram and flowchart, respectively, illustrating an example operation for controlling EN-DC in an NSA system according to various embodiments. FIGS. 5 and 6 illustrate an operation after an electronic device 101 is powered on.

FIG. 5 is a signal flow diagram 500 illustrating an example operation for controlling EN-DC in an NSA system according to various embodiments.

Referring to FIG. 5, a mobility management entity (MME) 501 may be included in a core network (e.g., an EPC 342 of FIG. 3) supporting 4G. The MME 501 may manage information associated with access authorization for the core network of the electronic device 101 and mobility of the electronic device 101.

When the electronic device 101 is powered on and camps on a cell where the electronic device 101 is located, in operation 505, the electronic device 101 may receive SIB2 broadcast from an LTE base station 340 of the cell where the electronic device 101 is located. The SIB2 may include UpperLayerIndication and public land mobile network (PLMN) information. The PLMN information may indicate information associated with a network operator of a network. The electronic device 101 may identify whether a network to which the electronic device 101 belongs (or a cell of the LTE base station 340) supports EN-DC, through UpperLayerIndication, and may enable or disable an EN-DC function based on the identified result.

In operation 510, the electronic device 101 may transmit an attach request message to the MME 501 via the LTE base station 340 to perform authentication, security setup, location update, and/or session establishment with the network to which the electronic device 101 belongs. According to an embodiment, the attach request message may include information indicating whether the electronic device 101 supports DC accompanied with NR (i.e., EN-DC).

In operation 515, the MME 501 may transmit a message (e.g., referred to as 'ueCapabilityEnquiry') querying about a capability of the electronic device 101 to the electronic device 101 to identify a type of an RAT supportable by the electronic device 101. For example, ueCapabilityEnquiry may include a type (e.g., evolved-universal terrestrial radio access-new radio (EUTRA), EUTRA-NR, and NR) of an RAT selectable by the electronic device 101.

In operation 520, the electronic device 101 may transmit a message (referred to as 'ueCapabilityInformation') indicating a type of an RAT supportable by the electronic device 101 to the MME 501 via the LTE base station 340. When the electronic device 101 enables the NR function, ueCapabilityInformation may indicate all of EUTRA, EUTRA-NR, and NR. When the electronic device 101 does not enable the NR function, ueCapabilityInformation may indicate only EUTRA.

FIG. 6 is a flowchart 600 illustrating an example operation of an electronic device for controlling EN-DC in an NSA system according to various embodiments.

Referring to FIG. 6, in operation 605, an electronic device 101 may be powered on.

In operation 610, the electronic device 101 may receive SIB2 from an LTE base station (e.g., an LTE base station 340 of FIG. 5) of a cell to which the electronic device 101 belongs. Although not illustrated in FIG. 6, the electronic device 101 may camp on the cell of the LTE base station before receiving the SIB2.

In operation 615, the electronic device 101 may identify whether a network to which the electronic device 101 belongs supports EN-DC, based on the SIB2 received from the LTE base station. For example, the electronic device 101 may identify whether the network supports the EN-DC based on UpperLayerIndication included in the SIB2.

When the network supports the EN-DC ("Yes" in operation 615), in operation 620, the electronic device 101 may enable an EN-DC function of the electronic device 101. For example, the electronic device 101 may enable all of components for performing wireless communication with a first cellular network 202 (e.g., a 4G network) in FIG. 2 and components for performing wireless communication with a second cellular network 294 (e.g., a 5G network) in FIG. 2. When the EN-DC function is enabled, in operation 625, the electronic device 101 may transmit an attach request message indicating that the electronic device 101 supports NR.

When the network does not support the EN-DC ("No" in operation 615), in operation 630, the electronic device 101 may disable the EN-DC function of the electronic device 101. For example, the electronic device 101 may enable only components for performing wireless communication with the first cellular network 292 in FIG. 2. When the EN-DC function is disabled, in operation 635, the electronic device 101 may transmit an attach request message indicating that the electronic device 101 does not support the NR.

Figure 7:
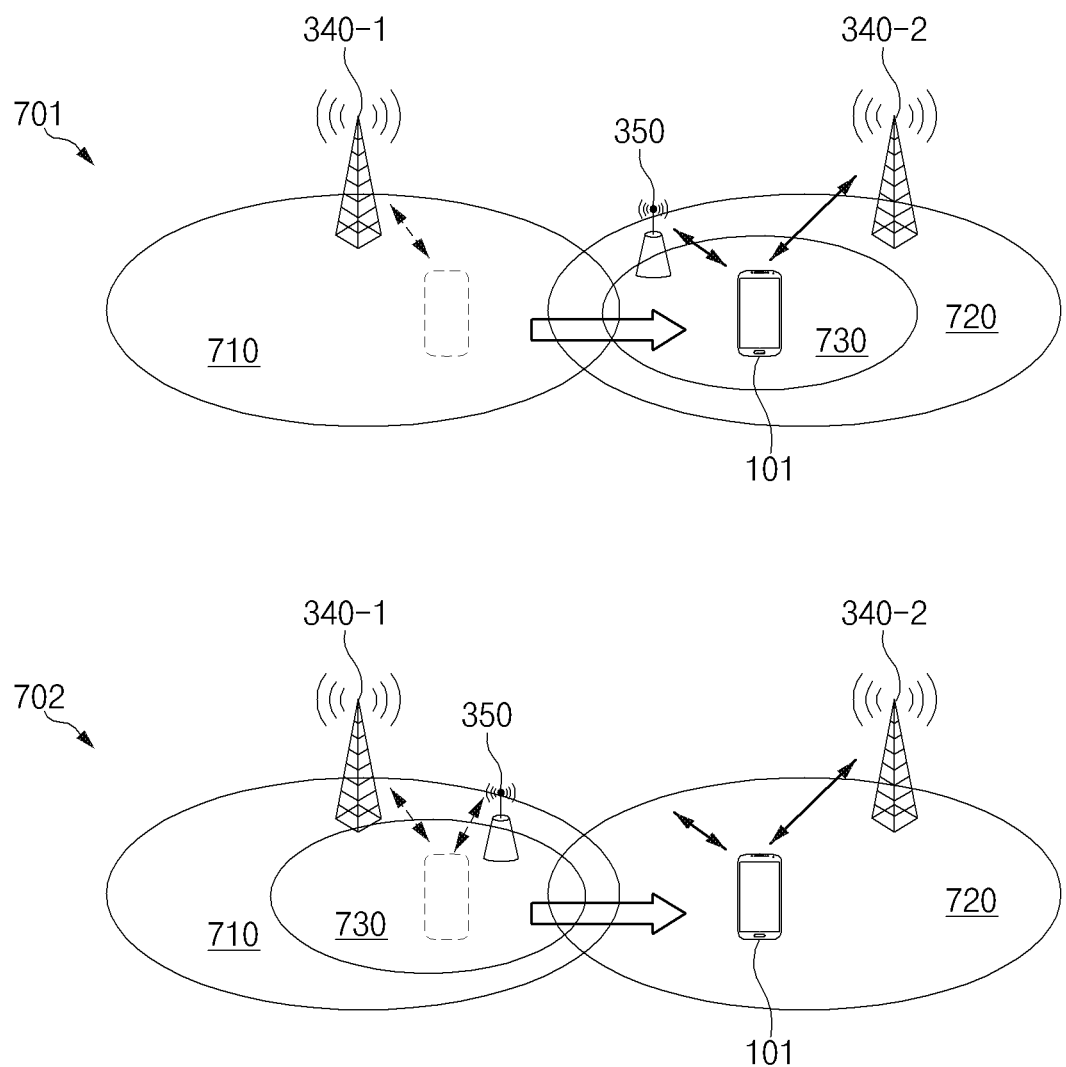
FIG. 7 is a diagram illustrating example cell reselection according to various embodiments.
Figure 10:
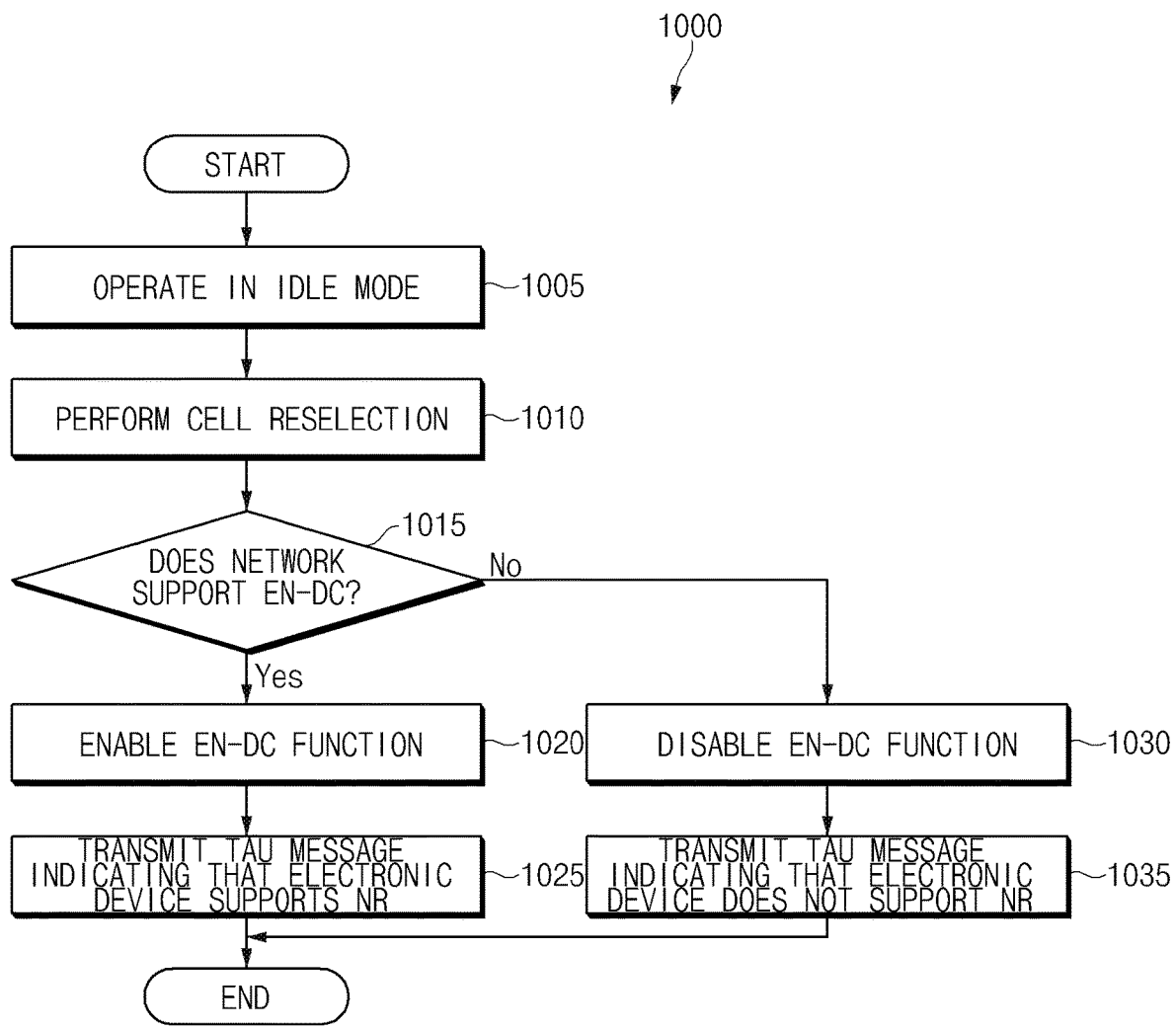
FIG. 10 is a flowchart illustrating an example operation of an electronic device for controlling EN-DC when perform cell reselection in an NSA system according to various embodiments.

FIGS. 7 and 10 are diagrams illustrating example operations for controlling EN-DC after an electronic device 101 performs cell reselection in an NSA system according to various embodiments.

FIG. 7 is a diagram illustrating an example describing cell reselection according to various embodiments.

Referring to FIG. 7, a first cell 710 of a first LTE base station 340-1 may not support EN-DC, and a second cell 720 of a second LTE base station 340-2 may support EN-DC with a third cell 730 of an NR base station 350. The electronic device 101 may move from the first cell 710 which does not support the EN-DC to the second cell 720 (or the third cell 730) which supports the EN-DC like reference numeral 701 depending on mobility. The electronic device 110 may move from the second cell 720 which supports the EN-DC to the first cell 710 which does not support the EN-DC like reference numeral 701 depending on mobility.

According to various embodiments, the electronic device 101 may change or maintain a cell on which the electronic device 101 camps through cell reselection. For example, when the electronic device 101 operates in an idle mode and when the electronic device 101 moves from the first cell 710 to the second cell 720 like reference numeral 701, it may measure signal intensity of a cell to switch the cell from the first cell 710 to the second cell 720. On the other hand, when the electronic device 101 operates in the idle mode and when the electronic device 101 moves from the second cell 720 to the first cell 710 like reference numeral 702, it may perform cell measurement to switch the cell from the second cell 720 to the first cell 710. When the electronic device 101 is not moved, it may maintain an existing cell (e.g., the first cell 710).

According to various embodiments, the electronic device 101 may control an NR function of the electronic device 101 by identifying whether a network supports the EN-DC in the changed or maintained cell. Because the electronic device 101 receives SIB2 from the first LTE base station 340-1 or the second LTE base station 340-2 while performing cell reselection, it may identify whether the network supports the EN-DC based on the received SIB2. The electronic device 101 may enable or disable an EN-DC function based on the identified result.

According to various embodiments, the electronic device 101 may control the NR function for each cell or may control the NR function for each PLMN (e.g., for each network operator). Whether the electronic device 101 controls the NR function for each cell or for each PLMN may be preset by the electronic device 101 or may be determined by a policy of a network operator.

According to an embodiment, when the electronic device 101 controls the NR function for each cell, it may control the NR function based on whether the changed or maintained cell supports the EN-DC. For example, when the electronic device 101 moves to the second cell 720 supporting the EN-DC, it may enable the EN-DC function. For another example, when the electronic device 101 moves to the first cell 710 which does not support the EN-DC, it may disable the EN-DC function.

According to an embodiment, when the electronic device 101 controls the NR function for each PLMN and when the electronic device 101 moves from the first cell 710 to the second cell 720 in a state where the EN-DC function is disabled, it may enable the EN-DC function, whereas, although the electronic device 101 moves from the second cell 720 to the first cell 710 in a state where the EN-DC function is enabled, it may fail to disable the EN-DC function. For example, when the electronic device 101 is preset to control the NR function for each PLMN, although UpperLayerIndication indicates that the network does not support the EN-DC, the electronic device 101 may fail to disable the EN-DC function. For another example, although the first cell 710 does not support the EN-DC by a policy of a network operator, the first LTE base station 340-1 may transmit UpperLayerIndication indicating that the first cell 710 supports the EN-DC.

Figure 8:
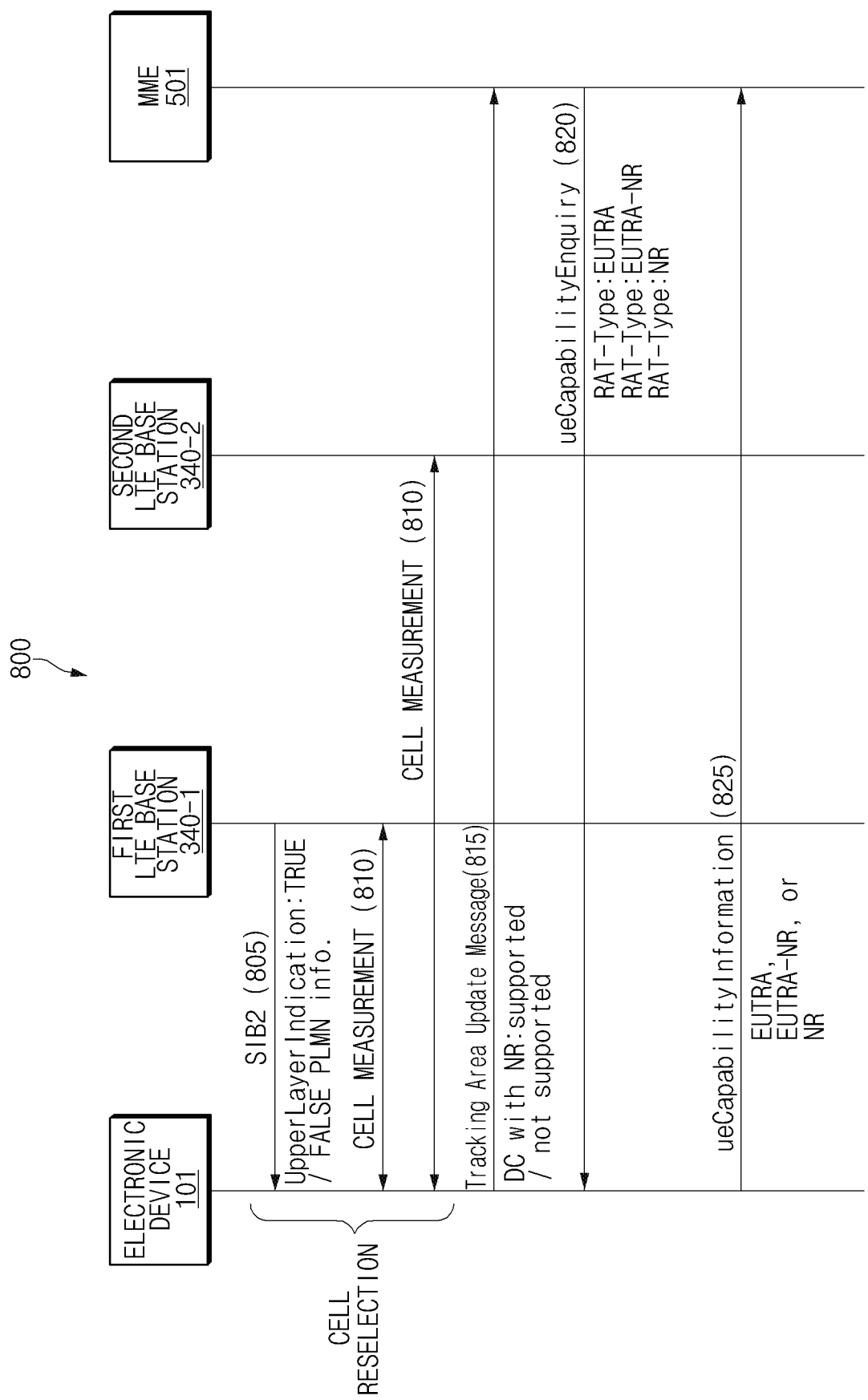
FIG. 8 is a signal flow diagram illustrating an example operation of controlling EN-DC when performing cell reselection in an NSA system according to various embodiments.

FIG. 8 is a signal flow diagram 800 illustrating an example operation for controlling EN-DC when performing cell reselection in an NSA system according to various embodiments.

Referring to FIG. 8, an electronic device 101 may perform cell reselection while it operates in an idle mode. For example, in operation 805, the electronic device 101 may receive SIB2 including UpperLayerIndication and PLMN information from a first LTE base station 340-1 of a cell where the electronic device 101 is located. In operation 810, the electronic device 101 may perform cell measurement by measuring intensity of a signal received from the first LTE base station 340-1 and a second LTE base station 340-2. The electronic device 101 may identify whether a network supports EN-DC based on UpperLayerIndication of the SIB2 received in the cell reselection procedure and may control an EN-DC function of the electronic device 101 depending on the identified result.

In operation 815, the electronic device 101 may transmit a tracking area update (TAU) message to an MME 501 to notify the MME 501 of a location of the electronic device 101 for each tracking area (TA). According to an embodiment, the TAU message may include information indicating whether the electronic device 101 supports NR.

In operation 820, the MME 501 may transmit ueCapabilityEnquiry to the electronic device 101 to identify a type of an RAT supportable by the electronic device 101. For example, ueCapabilityEnquiry may include the type (e.g., EUTRA, EUTRA-NR, and NR) of the RAT selectable by the electronic device 101.

In operation 825, the electronic device 101 may transmit ueCapabilityInformation indicating the type of the RAT supportable by the electronic device 101 to the MME 501. When the electronic device 101 enables the NR function, ueCapabilityInformation may indicate all of EUTRA, EUTRA-NR, and NR. When the electronic device 101 does not enable the NR function, ueCapabilityInformation may indicate only EUTRA.

Figure 9:
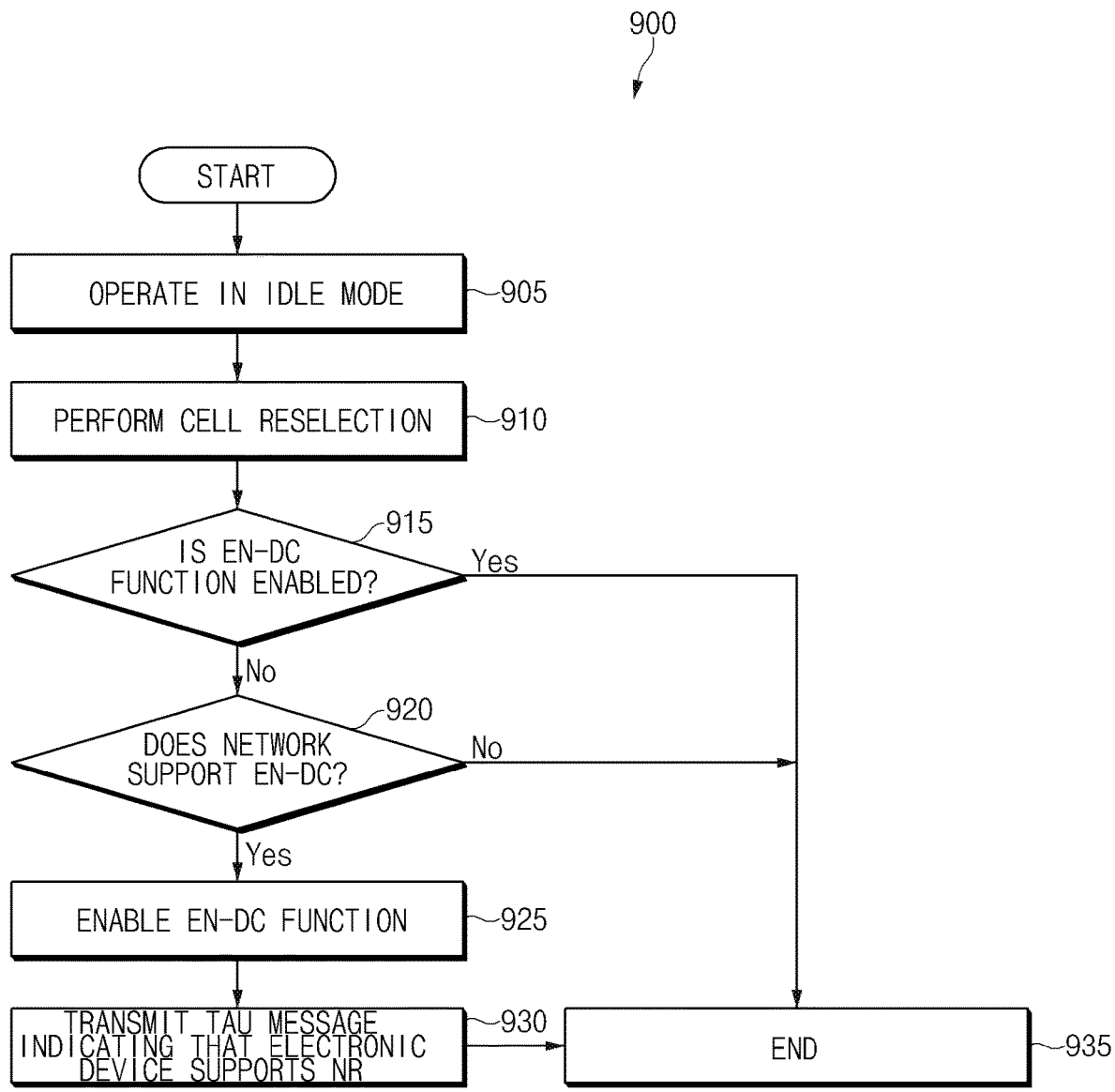
FIG. 9 is a flowchart illustrating an example operation of an electronic device for controlling EN-DC when performing cell reselection in an NSA system according to various embodiments.

FIG. 9 is a flowchart 900 illustrating an example operation of an electronic device 101 for controlling EN-DC when performing cell reselection in an NSA system according to various embodiments. FIG. 9 is a flowchart illustrating an embodiment for controlling EN-DC for each PLMN.

Referring to FIG. 9, in operation 905, an electronic device 101 may operate in an idle mode. The idle mode may refer, for example, to a state where the electronic device 101 does not perform wireless communication with a network. For example, the idle mode may include evolved packet system (EPS) connection management (ECM)-Idle or radio resource control (RRC)-Idle of an LTE protocol.

In operation 910, the electronic device 101 may perform cell reselection. For example, the electronic device 101 may receive SIB2 and another SIB from a base station and may perform cell measurement based on the received SIB. The electronic device 101 may determine a cell on which the electronic device 101 camps based on the result of performing the cell measurement.

In operation 915, the electronic device 101 may identify whether an EN-DC function of the electronic device 101 is enabled. When the EN-DC function is enabled ("Yes" in operation 915), in operation 935, the electronic device 101 may end the algorithm of FIG. 9.

When the EN-DC function is not enabled ("No" in operation 915), in operation 920, the electronic device 101 may identify whether a network supports EN-DC. For example, the electronic device 101 may identify whether the network supports the EN-DC based on UpperLayerIndication of the SIB2 received while performing cell reselection. When the network does not support the EN-DC ("No" in operation 920), in operation 935, the electronic device 101 may end the algorithm of FIG. 9.

When the network supports the EN-DC ("Yes" in operation 920), in operation 925, the electronic device 101 may enable the EN-DC function of the electronic device 101.

In operation 930, the electronic device 101 may transmit a TAU message indicating that the electronic device 101 supports NR to the network (e.g., MME 501).

FIG. 10 is another flowchart 1000 illustrating an example operation of an electronic device 101 for controlling EN-DC when performing cell reselection in an NSA system according to various embodiments. FIG. 10 is a flowchart illustrating an example embodiment for controlling EN-DC for each cell.

Referring to FIG. 10, in operation 1005, an electronic device 101 may operate in an idle mode. For example, the idle mode may include ECM-Idle or RRC-Idle of an LTE protocol.

In operation 1010, the electronic device 101 may perform cell reselection. The electronic device 101 may receive SIB2 from a base station through the cell reselection.

In operation 1015, the electronic device 101 may identify whether a network supports EN-DC. For example, the electronic device 101 may identify whether the network supports EN-DC based on UpperLayerIndication of the SIB2 received while performing the cell reselection.

When the network supports the EN-DC ("Yes" in operation 1015), in operation 1020, the electronic device 101 may enable an EN-DC function. In operation 1025, the electronic device 101 may transmit a TAU message indicating that the electronic device 101 supports NR to the base station.

When the network does not support the EN-DC ("No" in operation 1015), in operation 1030, the electronic device 101 may disable the EN-DC function. In operation 1035, the electronic device 101 may transmit a TAU message indicating that the electronic device 101 does not support the NR to the base station.

FIGS. 11, 12, 13 and 14 illustrate example operations for controlling EN-DC after an electronic device 101 performs cell reselection in an SA system according to various embodiments.

Figure 11:
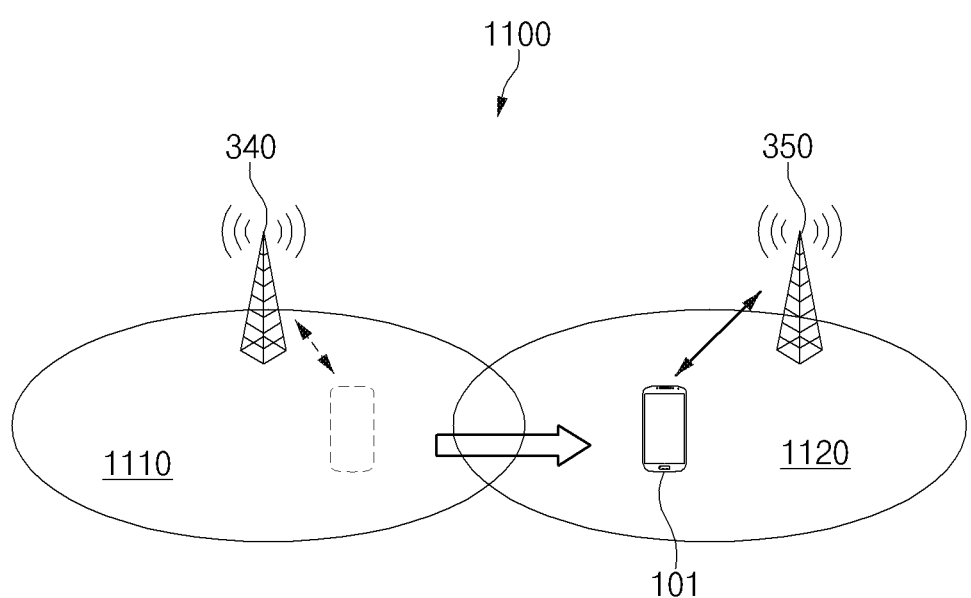
FIG. 11 is a diagram illustrating an example describing a standalone (SA) system according to various embodiments.

FIG. 11 is a diagram illustrating an example describing a standalone (SA) system 1100 according to various embodiments.

Referring to FIG. 11, an LTE base station 340 and an NR base station 350 may serve the electronic device 101 independently. The electronic device 101 may move from a first cell 1110 of the LTE base station 340 to a second cell 1120 of the NR base station 350 depending on its mobility. FIG. 11 illustrates only the first cell 1110 and the second cell 1120, but the number and deployment of a cell supporting LTE-RAT and a cell supporting NR-RAT may fail to be limited to the example shown in FIG. 11. For example, there may be no cell supporting the NR-RAT among cells neighboring to the first cell 1110.

According to various embodiments, in a state where the electronic device 101 camps on the first cell 1110, the electronic device 101 may receive SIB24 including information about inter-RAT cell reselection from the LTE base station 340. The electronic device 101 may control an NR function of the electronic device 101 by identifying whether a network (or a neighboring cell) supports the NR-RAT based on CarrierFreqListNR included in the SIB24.

According to various embodiments, the electronic device 101 may control EN-DC for each cell or may control the NR function for each PLMN. When controlling the NR function for each cell, the electronic device 101 may control the NR function based on whether the network supports the NR-RAT. For example, when there is a cell (e.g., the second cell 1120) supporting the NR-RAT among cells neighboring to the first cell 1110 where the electronic device 101 is currently located, the electronic device 101 may enable the NR function. When there is no cell supporting the NR-RAT among the cells neighboring to the first cell 1110, the electronic device 101 may disable the NR function. When the electronic device 101 controls the NR function for each PLMN and when there is a cell supporting the NR-RAT in a state where the NR function is disabled, the electronic device 101 may enable the NR function. On the other hand, although there is no cell supporting the NR-RAT in a state where the NR function is enabled, the electronic device 101 may fail to disable the NR function. Whether the electronic device 101 controls the NR function for each PLMN or for each cell may be preset by the electronic device 101 or may be determined by a policy of a network operator.

Figure 12:
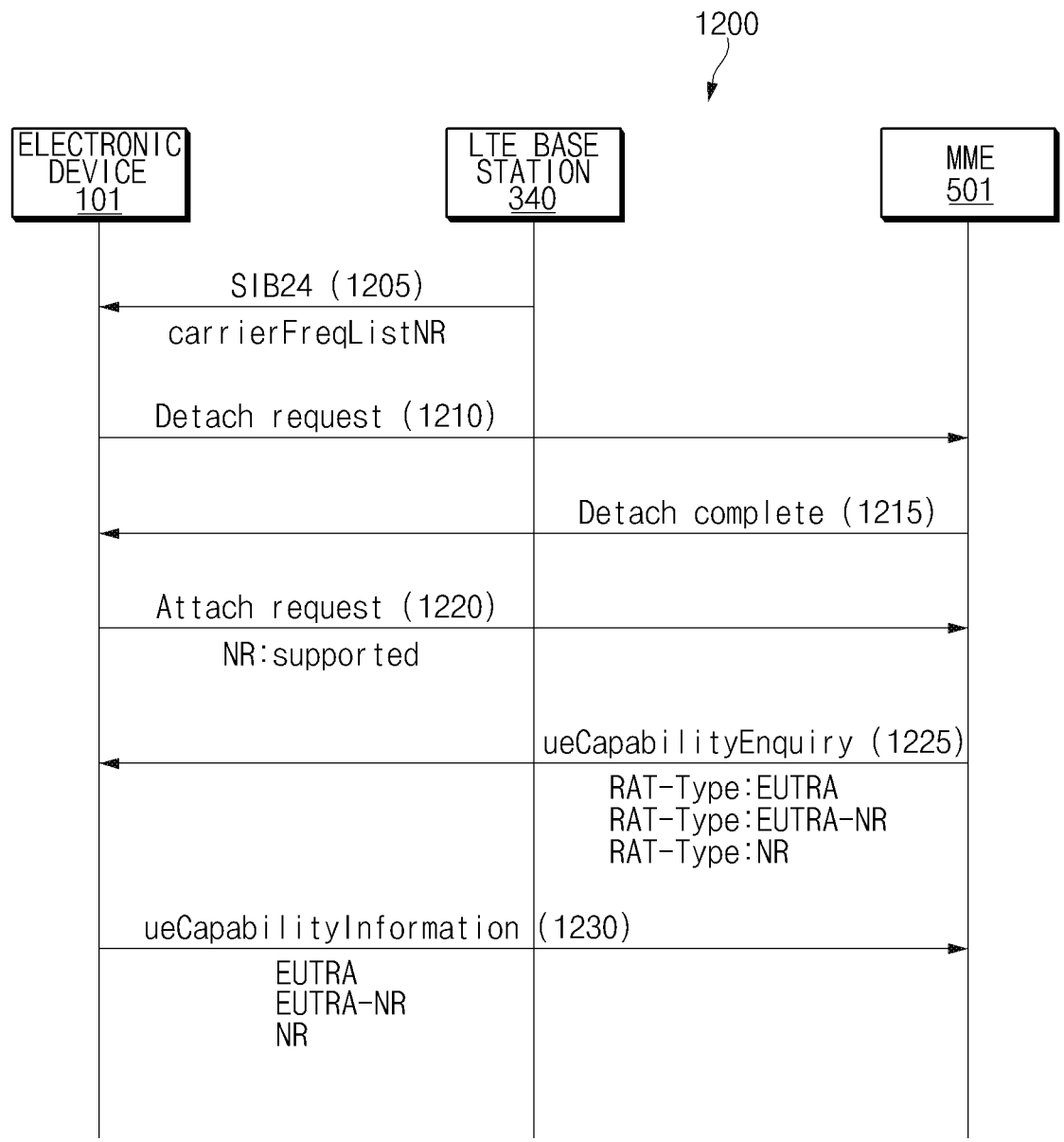
FIG. 12 illustrates a signal flow diagram illustrating an example operation of controlling an NR function in an SA system according to various embodiments.

FIG. 12 is a signal flow diagram 1200 illustrating example operations for controlling an NR function in an SA system according to various embodiments.

Referring to FIG. 12, in operation 1205, an electronic device 101 may receive SIB24 including carrierFreqListNR from an LTE base station 340 after camping on a cell (e.g., a first cell 1110 of FIG. 11) of an LTE base station 340. The electronic device 101 may identify whether a network supports NR-RAT based on carrierFreqListNR of the SIB24 and may control an NR function of the electronic device 101 depending on the identified result. When enabling the NR function, the electronic device 101 may perform operations 1210, 1215, 1220, 1225 and 1230 (which may be referred to herein after as operations 1210 to 1230). When disabling the NR function, the electronic device 101 may fail to perform operations 1210 to 1230.

In operation 1210, the electronic device 101 may transmit a detach request message to an MME 501 to request detachment from a 4G network. In operation 1215, the electronic device 101 may identify that the detachment is completed by receiving a detach complete message from the MME 501.

In operation 1220, the electronic device 101 may transmit an attach request message to the MME 501 to perform authentication, security setup, location update, and/or bearer establishment with a 5G network. According to an embodiment, the attach request message may include information indicating whether the electronic device 101 supports NR.

In operation 1225, the MME 501 may transmit ueCapabilityEnquiry to the electronic device 101 to identify a type of an RAT supportable by the electronic device 101. In operation 1230, the electronic device 101 may transmit ueCapabilityInformation indicating the type of the RAT supportable by the electronic device 101 to the MME 501. For example, ueCapabilityInformation may indicate all of EUTRA, EUTRA-NR, and NR.

Figure 13:
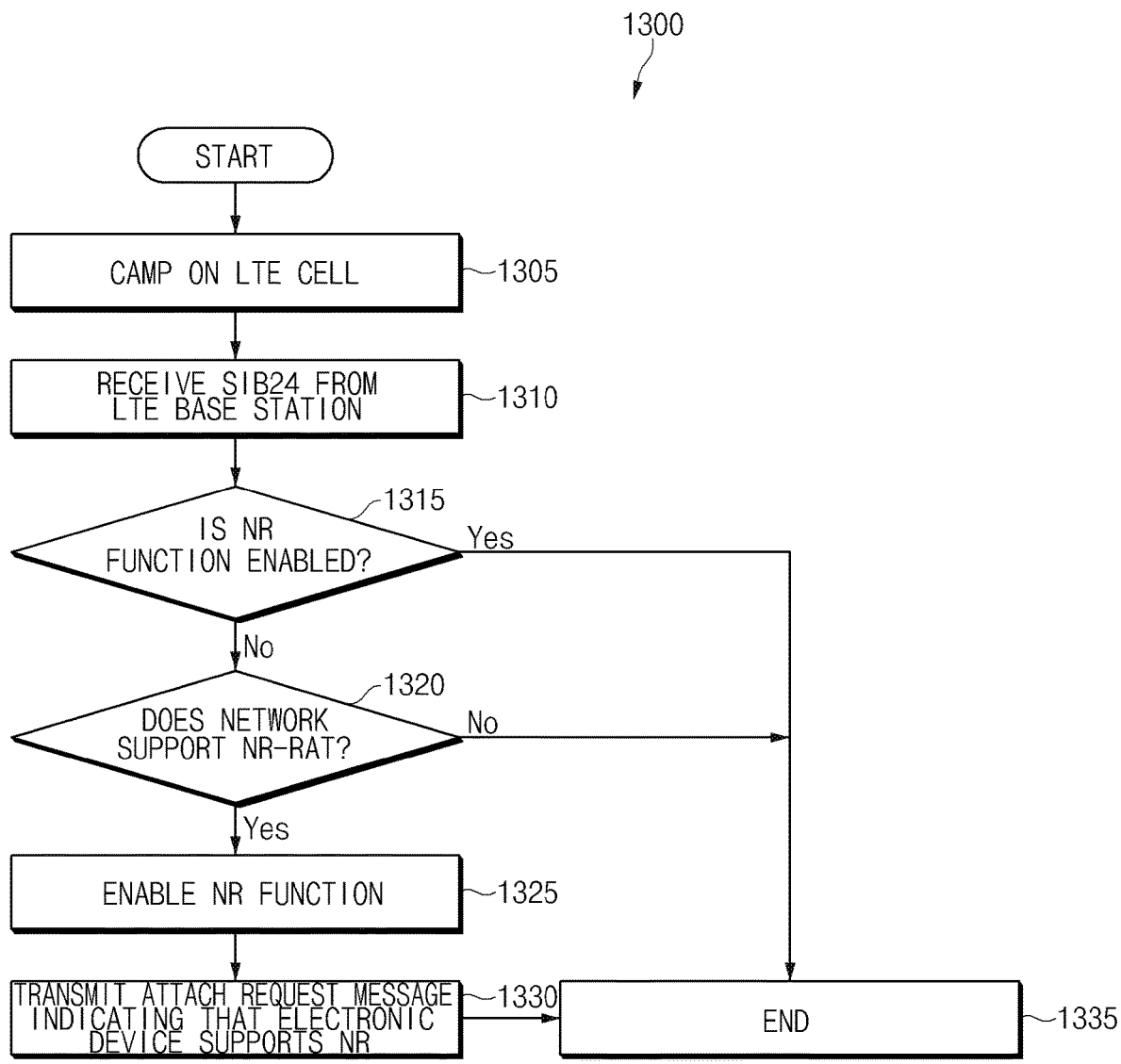
FIG. 13 is a flowchart illustrating an example operation of an electronic device for controlling an NR function in an SA system according to various embodiments.

FIG. 13 is a flowchart 1300 illustrating example operations of an electronic device 101 for controlling an NR function in an SA system according to various embodiments.

FIG. 13 is a flowchart illustrating an example embodiment for controlling an NR function for each PLMN.

Referring to FIG. 13, in operation 1305, an electronic device 101 may camp on an LTE cell (e.g., a first cell 1110 of FIG. 11).

In operation 1310, the electronic device 101 may receive SIB24 from an LTE base station of the cell on which the electronic device 101 camps.

In operation 1315, the electronic device 101 may identify whether an NR function of the electronic device 101 is enabled. When the NR function is enabled ("Yes" in operation 1315), in operation 1335, the electronic device 101 may end the algorithm of FIG. 13.

When the NR function is not enabled ("No" in operation 1315), in operation 1320, the electronic device 101 may identify whether a network (or a neighboring cell) supports NR-RAT. For example, the electronic device 101 may identify whether the network supports the NR-RAT based on carrierFreqListNR of the received SIB24. When the network does not support the NR-RAT ("No" in operation 1320), in operation 1335, the electronic device 101 may end the algorithm of FIG. 13.

When the network supports the NR-NAT ("Yes" in operation 1320), in operation 1325, the electronic device 101 may enable an NR function of the electronic device 101. In operation 1330, the electronic device 101 may transmit an attach request message indicating that the electronic device 101 supports NR to the network (e.g., MME 501).

Figure 14:
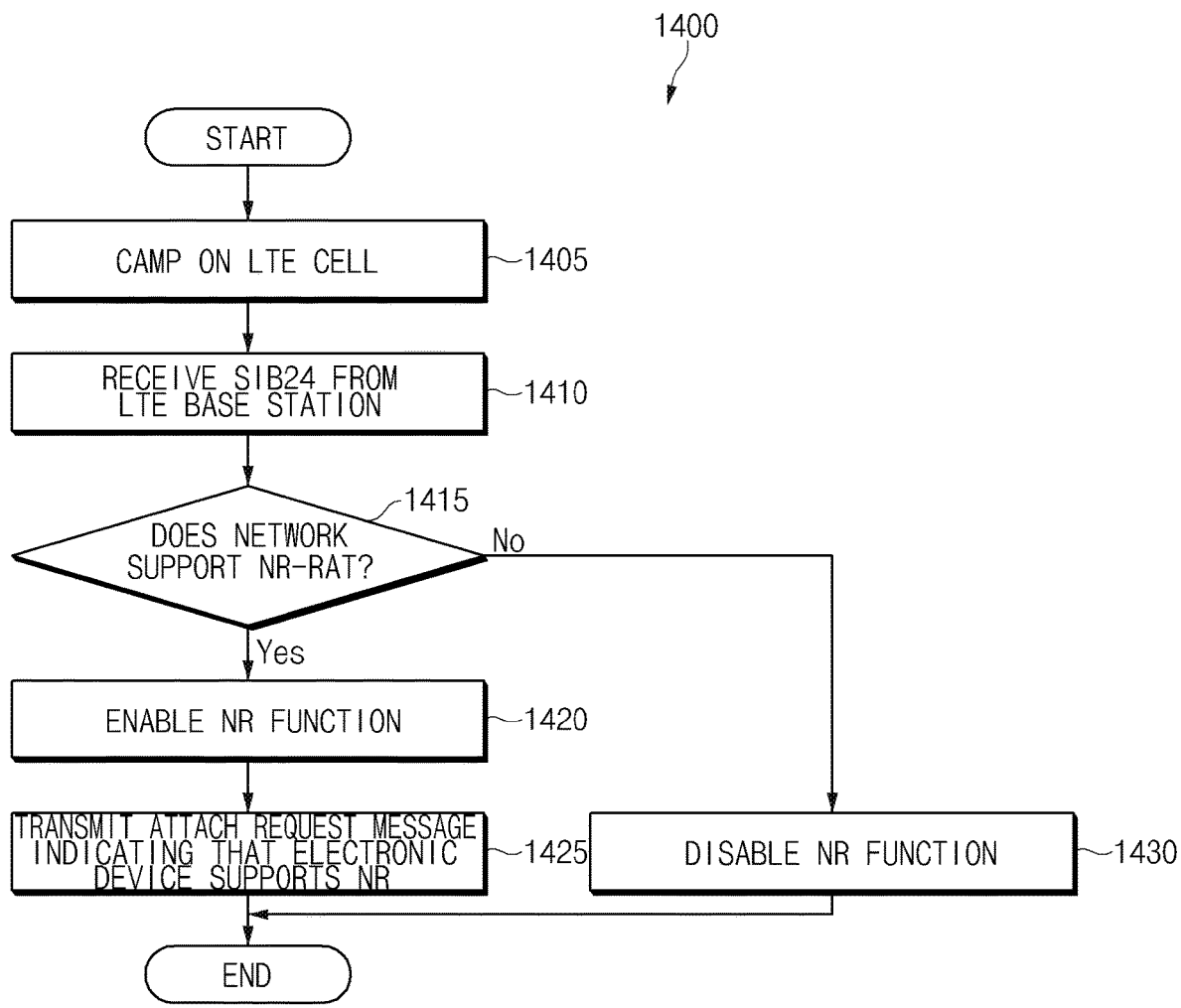
FIG. 14 is a flowchart illustrating an example operation of an electronic device for controlling an NR function in an SA system according to various embodiments.

FIG. 14 is another flowchart 1400 illustrating an example operation of an electronic device 101 for controlling an NR function in an SA system according to various embodiments. FIG. 14 is a flowchart illustrating an example embodiment for controlling an NR function for each cell.

Referring to FIG. 14, in operation 1405, an electronic device 101 may camp on an LTE cell.

In operation 1410, the electronic device 101 may receive SIB24 from an LTE base station of a cell on which the electronic device 101 camps.

In operation 1415, the electronic device 101 may identify whether a network (or a neighboring cell) supports NR-RAT. For example, the electronic device 101 may identify whether the network supports the NR-RAT based on carrierFreqListNR of the received SIB24.

When the network supports the NR-NAT ("Yes" in operation 1415), in operation 1420, the electronic device 101 may enable an NR function of the electronic device 101. In operation 1425, the electronic device 101 may transmit an attach request message indicating that the electronic device 101 supports NR to the network.

When the network does not support the NR-RAT ("No" in operation 1415), in operation 1430, the electronic device 101 may disable the NR function. In this case, the electronic device 101 may fail to transmit the attach request message.

Figure 15:
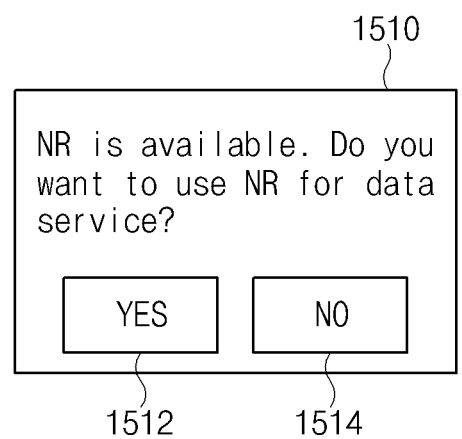
FIG. 15 is a diagram illustrating an example user interface (UI) querying whether to enable an NR function according to various embodiments.

FIG. 15 is a diagram illustrating an example UI 1510 querying whether to enable an NR function according to various embodiments.

Referring to FIG. 15, an electronic device 101 may query a user whether to enable an NR function without immediately enabling the NR function although a network supports EN-DC or NR. For example, the electronic device 101 may output the UI 1510 querying the user whether to enable the NR function on a display device 160 (e.g., a display) of FIG. 1. The UI 1510 may include text (e.g., 'NR is available. Do you want to use NR for data service?') notifying the user that the NR function is available and querying the user whether to enable the NR function and objects 1512 and 1514 capable of receiving a user input for enabling the NR function. According to an embodiment, the electronic device 101 may output the UI 1510 on a separate screen or may output the UI 1510 in the form of pop-up overlapped with another application execution screen.

FIG. 15 illustrates only an example embodiment of visually querying whether to enable the NR function on the display device 160, but according to another example embodiment, the electronic device 101 may, for example, and without limitation, query the user whether to enable the NR function using a sound and/or vibration.

The electronic device 101 may prevent and/or reduce a data usage charge, which is not desired by the user, from being incurred by querying the user whether to enable the NR function.

Figure 16:
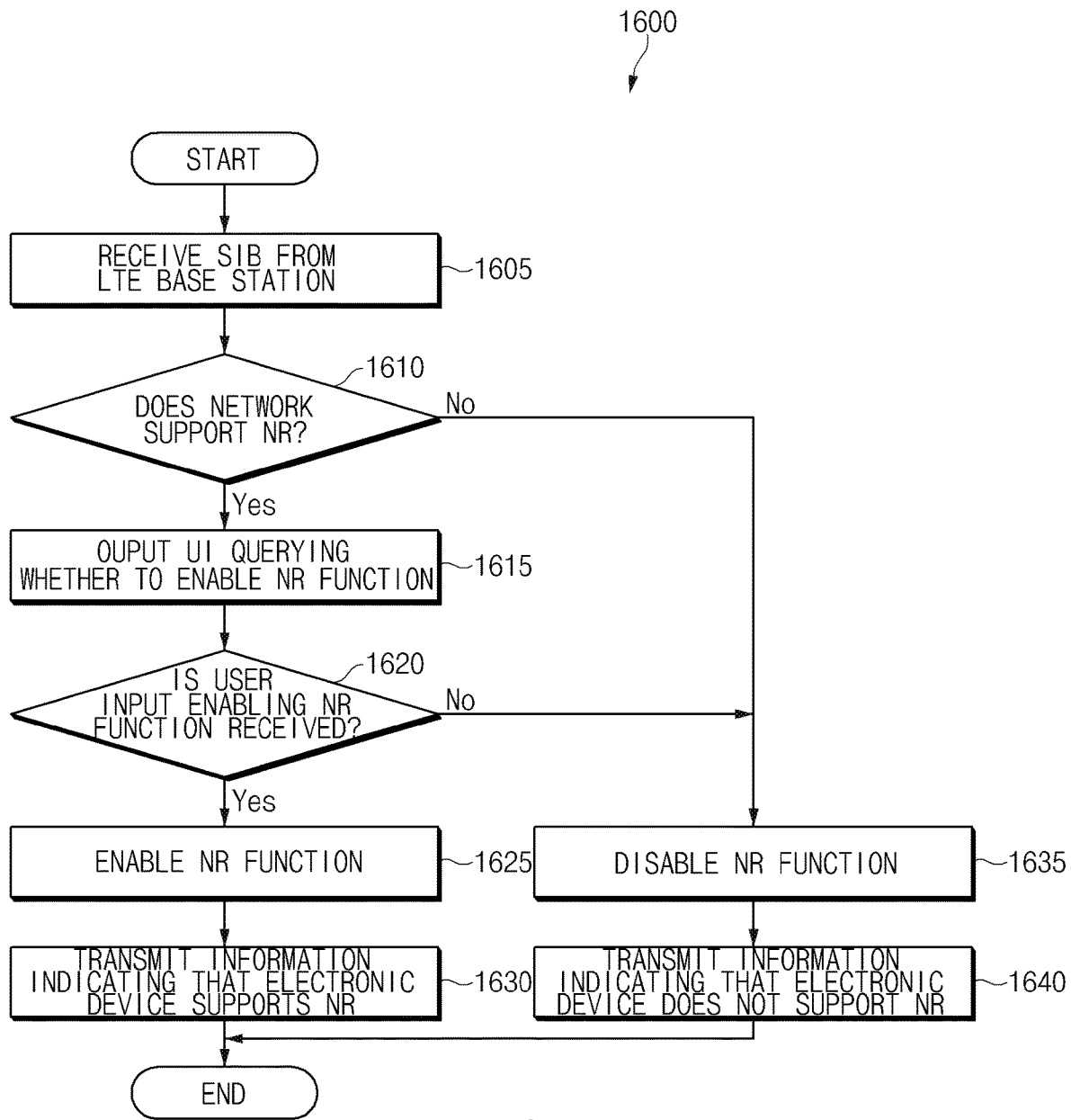
FIG. 16 is a flowchart illustrating an example operation of an electronic device for querying whether to enable an NR function according to various embodiments.

FIG. 16 is a flowchart 1600 illustrating an example operation of an electronic device 101 for querying whether to enable an NR function according to various embodiments.

Referring to FIG. 16, in operation 1605, the electronic device 101 may receive SIB from an LTE base station. For example, after the electronic device 101 is powered on or after the electronic device 101 operates in an idle mode, it may receive SIB2 from the LTE base station. For another example, after camping on a cell of the LTE base station, the electronic device 101 may receive SIB24 from the LTE base station.

In operation 1610, the electronic device 101 may identify whether a network supports NR (or EN-DC) based on the received SIB. For example, the electronic device 101 may identify whether the network supports the NR based on information indicated by UpperLayerIndication included in the SIB2 or carrierFreqListNR included in the SIB24.

When the network does not support the NR ("No" in operation 1610), in operation 1635, the electronic device 101 may disable the NR function. In operation 1640, the electronic device 101 may transmit information indicating that the electronic device 101 does not support the NR. For example, the electronic device 101 may transmit an attach request message or a TAU message.

When the network supports the NR ("Yes" in operation 1610), in operation 1615, the electronic device 101 may output a UI (e.g., a UI 1510 of FIG. 15) querying whether to enable the NR function.

After outputting a UI, in operation 1620, the electronic device 101 may identify whether a user input enabling the NR function is received. For example, the electronic device 101 may receive a user input selecting one of objects (e.g., objects 1512 and 1514 of FIG. 15) included in the UI.

When a user input enabling the NR function (e.g., a user input selecting the first object 1512 of FIG. 15) is received ("Yes" in operation 1620), in operation 1625, the electronic device 101 may enable the NR function. In operation 1630, the electronic device 101 may transmit information indicating that the electronic device 101 supports the NR, through, for example, an attach request message or a TAU message.

When a user input disabling the NR function (e.g., a user input selecting the second object 1514 of FIG. 15) is received or, for example, an input is not received during a predefined time period after displaying the UI ("No" in operation 1620), the electronic device 101 may perform operations 1635 and 1640.

Figure 17:
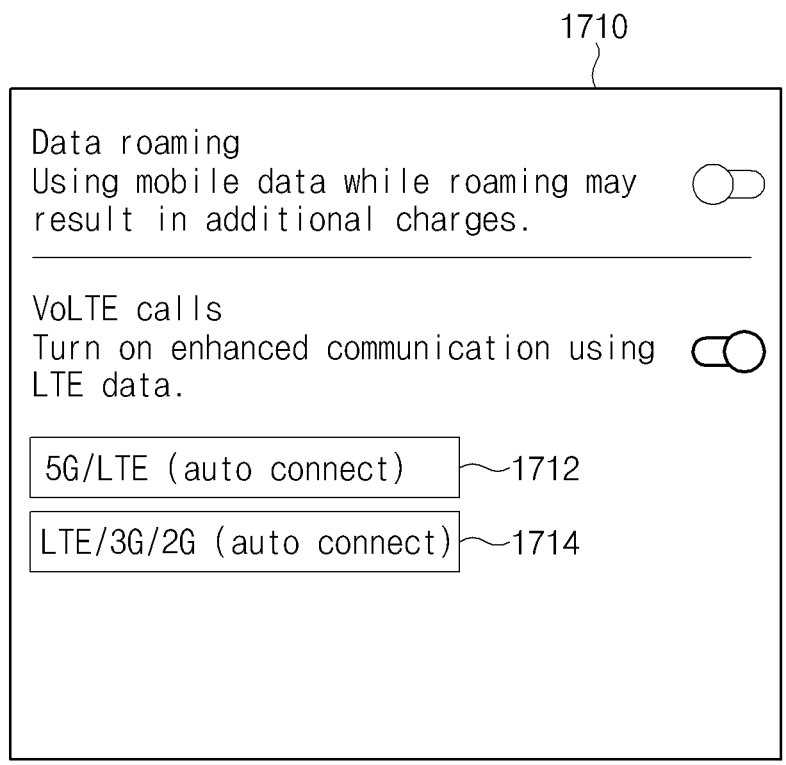
FIG. 17 is a diagram illustrating an example screen for setting activation of an NR function according to various embodiments.

FIG. 17 is a diagram illustrating an example screen 1710 for setting activation of an NR function according to various embodiments.

Referring to FIG. 17, an electronic device 101 may output a setting screen 1710 on a display device 1600 of FIG. 1 such that a user may select whether the electronic device 101 queries whether to enable the NR function. For example, the setup screen 1710 may include a first object 1712 capable of setting to automatically enable 5G (or NR) and LTE and a second object 1714 capable of setting to automatically enable only LTE, 3G, and 2G. When the first object 1712 is selected, the electronic device 101 may immediately enable the NR function without querying the user whether to enable the NR function. When the second object 1714 is selected, the electronic device 101 may query the user whether to enable the NR function.

As described above, an electronic device according to various example embodiments may include: wireless communication circuitry, at least one processor operatively connected with the wireless communication circuitry, and a memory operatively connected with the at least one processor. The memory may store instructions which, when executed, cause the at least one processor to control the electronic device to: identify a state of the electronic device, receive a system information block (SIB) from a first base station supporting a first cellular network, via the wireless communication circuitry, identify whether a network to which the electronic device belongs supports dual connectivity (DC) between the first cellular network and a second cellular network based on information included in the SIB, enable a second cellular network function of the wireless communication circuitry based on the network supporting the DC, and transmit information indicating that the second cellular network function of the electronic device is enabled to the network via the wireless communication circuitry.

According to an example embodiment, the instructions may, when executed, cause the at least one processor to control the electronic device to: detect that the electronic device is powered on and transmit an attach request message indicating that the second cellular network function of the electronic device is enabled to the network via the wireless communication circuitry based on the network supporting the DC.

According to an example embodiment, the instructions may, when executed, cause the at least one processor to control the electronic device to: identify that the electronic device operates in an idle mode and transmit a tracking area update (TAU) message indicating that the second network function of the electronic device is enabled to the network via the wireless communication circuitry based on the network supporting the DC.

According to an example embodiment, the instructions may, when executed, cause the at least one processor to control the electronic device to: detect that the electronic device camps on a cell of the first base station via the wireless communication circuitry, and transmit an attach request message indicating that the second network function of the electronic device is enabled to the network via the wireless communication circuitry based on the network supporting the DC.

According to an example embodiment, based on the electronic device being set to control the second cellular network function for each public land mobile network (PLMN), the instructions may, when executed, cause the at least one processor to control the electronic device to: identify whether the second cellular network function is enabled, maintain the second cellular network function based on the second cellular network function being enabled, and identify whether the network supports the DC based on the second cellular network function being disabled.

According to an example embodiment, based on the electronic device being set to control the second cellular network function for each cell, the instructions may, when executed, cause the at least one processor to control the electronic device to: disable the second cellular network function based on the network not supporting the DC and transmit information indicating that the second cellular network function of the electronic device is disabled to the network via the wireless communication circuitry.

According to an example embodiment, the electronic device may further include a display. The instructions may, when executed, cause the at least one processor to control the electronic device to: output a user interface querying whether to enable the second cellular network function on the display based on the network supporting the DC, enable the second cellular network function based on receiving an input enabling the second cellular network function via the user interface, and disable the second cellular network function based on receiving an input disabling the second cellular network function via the user interface.

According to an example embodiment, the SIB may include a second type of SIB broadcast from the first base station, and the second type of SIB may include UpperLayerIndication included in a long term evolution (LTE) protocol.

An example method of an electronic device according to various example embodiments may include: identifying a state of the electronic device, receiving an SIB from a first base station supporting a first cellular network, identifying whether a network to which the electronic device belongs supports DC between the first cellular network and a second cellular network based on information included in the SIB, enabling a second cellular network function of the electronic device based on the network supporting the DC, and transmitting information indicating that the second cellular network function of the electronic device is enabled to the network.

According to an example embodiment, the identifying of the state of the electronic device may include detecting that the electronic device is powered on. The transmitting of the information indicating that the second cellular network function of the electronic device is enabled may include transmitting an attach request message.

According to an example embodiment, the identifying of the state of the electronic device may include identifying that the electronic device operates in an idle mode. The transmitting of the information indicating that the second cellular network function of the electronic device is enabled may include transmitting a tracking area update (TAU) message.

According to an example embodiment, the identifying of the state of the electronic device may include detecting that the electronic device camps on a cell of the first base station. The transmitting of the information indicating that the second cellular network function of the electronic device is enabled may include transmitting an attach request message.

According to an example embodiment, based on the electronic device being set to control the second cellular network function for each public land mobile network (PLMN), the identifying of whether the network supports the DC may include identifying whether the second cellular network function is enabled, maintaining the second cellular network function based on the second cellular network function being enabled, or identifying whether the network supports the DC based on the second cellular network function being disabled.

According to an example embodiment, the method may further include, based on the electronic device being set to control the second cellular network function for each cell and based on the network not supporting the DC, disabling the second cellular network function and transmitting information indicating that the second cellular network function of the electronic device is disabled to the network.

According to an example embodiment, the method may further include, based on the network supporting the DC, outputting a user interface querying whether to enable the second cellular network function. The enabling of the second cellular network function may include enabling the second cellular network function based on receiving an input enabling the second cellular network function via the user interface.

An electronic device according to various example embodiments may include: wireless communication circuitry and at least one processor operatively connected with the wireless communication circuitry. The at least one processor may be configured to control the electronic device to: detect that the electronic device camps on a first cell supporting a first cellular network, receive a system information block (SIB) from a base station of the first cell, identify whether a network to which the electronic device belongs supports a second cellular network, based on the received SIB, enable a second cellular network function of the wireless communication circuitry based on the network supporting the second cellular network, and transmit information indicating that the second cellular network function of the electronic device is enabled to the network via the wireless communication circuitry.

According to an example embodiment, based on the electronic device being set to control the second cellular network function for each public land mobile network (PLMN), the at least one processor may be configured to: identify whether the second cellular network function is enabled, maintain the second cellular network function based on the second cellular network function being enabled, and identify whether the network supports the second cellular network based on the second cellular network function being disabled.

According to an example embodiment, based on the electronic device being set to control the second cellular network function for each cell, the at least one processor may be configured to control the electronic device to: disable the second cellular network function based on the network not supporting the second cellular network and transmit information indicating that the second cellular network function of the electronic device is disabled to the network via the wireless communication circuitry.

According to an example embodiment, the electronic device may further include a display. The at least one processor may be configured to control the electronic device to: output a user interface querying whether to enable the second cellular network function on the display based on the network supporting the second cellular network, enable the second cellular network function based on receiving an input enabling the second cellular network function via the user interface, and disable the second cellular network function based on receiving an input disabling the second cellular network function via the user interface.

According to an example embodiment, the SIB may include a $24^{th}$ type of SIB broadcast from a base station of the first cell, and the $24^{th}$ type of SIB may include carrier-FreqListNR included, for example, in a long term evolution (LTE) protocol.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various example embodiments disclosed in the disclosure, the user terminal may perform operations using a wireless communication technology in response to a state of a network where the user terminal is located, without a software update.

According to various example embodiments disclosed in the disclosure, an overload of a network which does not support an NR network may be reduced.

In addition, various effects ascertained directly or indirectly through the present disclosure may be provided.

While the disclosure has been illustrated and described with reference to various example embodiments thereof, it will be understood that the various example embodiments are intended to be illustrative, not limiting. It will be further understood by those skilled in the art that various changes in form and details may be made therein without departing from the true spirit and full scope of the disclosure, including the appended claims and their equivalents.

What is claimed is:

1. An electronic device, comprising:
wireless communication circuitry;
at least one processor operatively connected with the wireless communication circuitry; and
a memory operatively connected with the at least one processor,
wherein the memory stores instructions which are configured to, when executed, cause the at least one processor to control the electronic device to:
identify a state of the electronic device;
receive a system information block (SIB) from a first base station supporting a first cellular network via the wireless communication circuitry;
identify whether a network to which the electronic device belongs supports dual connectivity (DC) between the first cellular network and a second cellular network based on information included in the SIB;
based on at least the network supporting the DC between the first cellular network and the second cellular network:
enable a second cellular network function of the wireless communication circuitry; and
transmit information indicating that the second cellular network function of the electronic device is enabled to the network via the wireless communication circuitry; and
based on at least the network not supporting the DC between the first cellular network and the second cellular network:
disable the second cellular network function; and
transmit information indicating that the second cellular network function of the electronic device is disabled to the network via the wireless communication circuitry.

2. The electronic device of claim 1, wherein the instructions, when executed, further cause the at least one processor to control the electronic device to:
detect that the electronic device is powered on; and
transmit an attach request message indicating that the second cellular network function of the electronic device is enabled to the network via the wireless communication circuitry based on the network supporting the DC.

3. The electronic device of claim 1, wherein the instructions, when executed, further cause the at least one processor to control the electronic device to:
identify that the electronic device operates in an idle mode; and
transmit a tracking area update (TAU) message indicating that the second cellular network function of the electronic device is enabled to the network via the wireless communication circuitry based on the network supporting the DC.

4. The electronic device of claim 1, wherein the instructions, when executed, further cause the at least one processor to control the electronic device to:
detect that the electronic device camps on a cell of the first base station via the wireless communication circuitry; and
transmit an attach request message indicating that the second cellular network function of the electronic device is enabled to the network via the wireless communication circuitry based on the network supporting the DC.

5. The electronic device of claim 1, wherein, based on the electronic device being configured to control the second cellular network function for each public land mobile network (PLMN), and the instructions, when executed, further cause the at least one processor to control the electronic device to:
identify whether the second cellular network function is enabled;
maintain the second cellular network function based on the second cellular network function being enabled; and
identify whether the network supports the DC based on the second cellular network function being disabled.

6. The electronic device of claim 1, further comprising:
a display,
wherein the instructions, when executed, further cause the at least one processor to control the electronic device to:
output a user interface querying whether to enable the second cellular network function on the display based on the network supporting the DC;
enable the second cellular network function based on receiving an input enabling the second cellular network function via the user interface; and disable the second cellular network function based on receiving an input disabling the second cellular network function via the user interface.

7. The electronic device of claim 1, wherein the SIB includes a second type of SIB broadcast from the first base station, and
wherein the second type of SIB includes UpperLayerindication included in a long term evolution (LTE) protocol.

8. The electronic device of claim 1, further comprising: a display,
wherein at least one processor is further configured to control the electronic device to:
output a user interface querying whether to enable the second cellular network function on the display based on the network supporting the second cellular network;
enable the second cellular network function based on receiving an input enabling the second cellular network function via the user interface; and
disable the second cellular network function based on receiving an input disabling the second cellular network function via the user interface.

9. The electronic device of claim 1, wherein the SIB includes a $24^{th}$ type of SIB broadcast from a base station of the first cell, and
wherein the $24^{th}$ type of SIB includes carrierFreqListNR included in a long term evolution (LTE) protocol.

10. The electronic device of claim 1, wherein the memory stores instructions which, when executed, further cause the at least one processor to control the electronic device to: based on at least the network supporting the DC between the first cellular network and the second cellular network, transmitting an attach request message indicating that the second cellular network function of the electronic device is enabled and that the electronic device supports the DC to a mobility management entity configured to manage information associated with access authorization for the network via the wireless communication circuitry, wherein the attach request message includes information to perform authentication, security setup, location update, and/or session establishment with the network.

11. A method of operating an electronic device, the method comprising:
identifying a state of the electronic device;
receiving a system information block (SIB) from a first base station supporting a first cellular network;
identifying whether a network to which the electronic device belongs supports dual connectivity (DC) between the first cellular network and a second cellular network based on information included in the SIB;
based on at least the network supporting the DC between the first cellular network and the second cellular network:
enabling a second cellular network function of the electronic device; and
transmitting information indicating that the second cellular network function of the electronic device is enabled to the network; and
based on at least the network not supporting the DC between the first cellular network and the second cellular network:
disabling the second cellular network function; and
transmitting information indicating that the second cellular network function of the electronic device is disabled to the network.

12. The method of claim 11, wherein the identifying of the state of the electronic device includes detecting that the electronic device is powered on, and
wherein the transmitting of the information indicating that the second cellular network function of the electronic device is enabled includes transmitting an attach request message.

13. The method of claim 11, wherein the identifying of the state of the electronic device includes identifying that the electronic device operates in an idle mode, and
wherein the transmitting of the information indicating that the second cellular network function of the electronic device is enabled includes transmitting a tracking area update (TAU) message.

14. The method of claim 11, wherein the identifying of the state of the electronic device includes detecting that the electronic device camps on a cell of the first base station, and
wherein the transmitting of the information indicating that the second cellular network function of the electronic device is enabled includes transmitting an attach request message.

15. The method of claim 11, wherein, based on the electronic device being configured to control the second cellular network function for each public land mobile network (PLMN), the identifying of whether the network supports the DC includes:
identifying whether the second cellular network function is enabled;
maintaining the second cellular network function based on the second cellular network function being enabled; or
identifying whether the network supports the DC based on the second cellular network function being disabled.

16. The method of claim 11, further comprising:
based on the network supporting the DC, outputting a user interface querying whether to enable the second cellular network function,
wherein the enabling of the second cellular network function includes:
enabling the second cellular network function based on receiving an input enabling the second cellular network function via the user interface.

* * * * *